(12) United States Patent
Kadono et al.

(10) Patent No.: US 7,933,330 B2
(45) Date of Patent: Apr. 26, 2011

(54) PICTURE CODING APPARATUS, PICTURE DECODING APPARATUS AND THE METHODS

(75) Inventors: Shinya Kadono, Nishinomiya (JP); Satoshi Kondo, Yawata (JP); Kiyofumi Abe, Kadoma (JP)

(73) Assignee: Panasonic Corporation, Osaka (JP)

( * ) Notice: Subject to any disclaimer, the term of this patent is extended or adjusted under 35 U.S.C. 154(b) by 87 days.

(21) Appl. No.: 12/071,475

(22) Filed: Feb. 21, 2008

(65) Prior Publication Data

US 2008/0181297 A1 Jul. 31, 2008

Related U.S. Application Data

(62) Division of application No. 10/491,174, filed as application No. PCT/JP03/12053 on Sep. 22, 2003.

(30) Foreign Application Priority Data

Oct. 1, 2002 (JP) .................................. 2002-289303

(51) Int. Cl.
*H04N 7/12* (2006.01)
*H04N 11/02* (2006.01)
*H04N 11/04* (2006.01)

(52) U.S. Cl. ......... 375/240.12; 375/240.13; 375/240.14; 375/240.15; 375/240.16

(58) Field of Classification Search . 375/240.12–240.16
See application file for complete search history.

(56) References Cited

U.S. PATENT DOCUMENTS

| 5,168,357 | A | | 12/1992 | Kutka |
| 5,274,442 | A | * | 12/1993 | Murakami et al. ......... 375/240.2 |
| 5,686,963 | A | | 11/1997 | Uz et al. |
| 6,018,368 | A | | 1/2000 | Kim et al. |
| 6,031,575 | A | | 2/2000 | Suzuki et al. |
| 6,081,551 | A | * | 6/2000 | Etoh .............................. 375/240 |
| 6,094,225 | A | | 7/2000 | Han |
| 6,310,919 | B1 | | 10/2001 | Florencio |
| 6,414,719 | B1 | | 7/2002 | Parikh |
| 6,574,274 | B2 | | 6/2003 | Obata et al. |
| 6,788,740 | B1 | | 9/2004 | van der Schaar et al. |

(Continued)

FOREIGN PATENT DOCUMENTS

JP 5-91500 4/1993

(Continued)

OTHER PUBLICATIONS

U.S. Office Action issued Apr. 6, 2009 in U.S. Appl. No. 10/491,174.

(Continued)

*Primary Examiner* — Marsha D Banks Harold
*Assistant Examiner* — Chikaodili E Anyikire
(74) *Attorney, Agent, or Firm* — Wenderoth, Lind & Ponack, L.L.P.

(57) ABSTRACT

A weighting factor mode determination unit determines whether to code an interlaced picture in a field mode or a frame mode, based on a value of a flag "AFF" indicating whether or not to switch between the field mode and the frame mode on a block-by-block basis and notifies switches and a multiplexing unit of the determined mode. The switches select either the field mode or the frame mode according to the notified mode. A field weighting factor coding unit or a frame weighting factor coding unit performs respectively the coding of respective weighting factors when the respective modes are selected.

2 Claims, 27 Drawing Sheets

U.S. PATENT DOCUMENTS

| | | | |
|---|---|---|---|
| 2001/0031095 A1 | 10/2001 | Itokawa | |
| 2002/0027610 A1 | 3/2002 | Jiang et al. | |
| 2002/0118750 A1 | 8/2002 | Yagasaki et al. | |
| 2003/0099292 A1* | 5/2003 | Wang et al. | 375/240.12 |
| 2004/0008782 A1 | 1/2004 | Boyce et al. | |
| 2004/0008783 A1 | 1/2004 | Boyce | |
| 2004/0258162 A1* | 12/2004 | Gordon et al. | 375/240.25 |

FOREIGN PATENT DOCUMENTS

| | | |
|---|---|---|
| JP | 5-284535 | 10/1993 |
| JP | 9-163376 | 6/1997 |
| JP | 11-75187 | 3/1999 |

OTHER PUBLICATIONS

Supplementary European Search Report issued Dec. 20, 2007 in the European Patent Application No. 03799117.1.

International Search Report issued Jan. 13, 2004 in PCT/JP03/12053.

Krit Panusopone et al., "Multi-frame interpolative prediction in AFF", Joint Video Team (JVT) of ISO/IEC MPEG and ITU-T VCEG, 4th Meeting: Klagenfurt, Austria, Jul. 22-26, 2002, pp. 1-8.

Text of Committee Draft of Joint Video Specification (ITU-T Rec. H264 ISO/IEC 14496-10 AVC) MPEG02/N4810 ISO/IEC JTC1/SC29/WG11 MPEG02/N4810, Fairfax, US, May 2002, pp. i-133.

Yoshihiro Kikuchi et al., "Multi-frame interpolative prediction with modified syntax", Joint Video Team (JVT) of ISO/IEC MPEG and ITU-T VCEG, (ISO/IEC JTC1/SC29/WG11 and ITU-T SG16 Q.6), 3rd Meeting: Fairfax, Virginia, USA, Mar. 6, 2002, pp. 1-13.

Yoshihiro Kikuchi et al., "Improved multiple frame motion compensation using frame interpolation", Joint Video Team (JVT) of ISO/IEC MPEG and ITU-T VCEG, (ISO/IEC JTC1/SC29/WG11 and ITU-T SG16 Q.6), 2nd Meeting: Geneva, CH, Jan. 29-Feb. 1, 2002, pp. 1-5.

Limin Wang et al., "MB-Level Adaptive Frame/Field Coding for JVT", Joint Video Team (JVT) of ISO/IEC MPEG & ITU-T VCEG (ISO/IEC JTC1/SC29/WG11 and ITU-T SG16 Q.6), 2nd Meeting: Geneva, CH, Jan. 29- Feb. 1, 2002, pp. 1-15.

U.S. Office Action issued May 9, 2008 in U.S. Appl. No. 10/491,174.

U.S. Office Action dated Dec. 17, 2009 issued in U.S. Appl. No. 10/491,174.

* cited by examiner

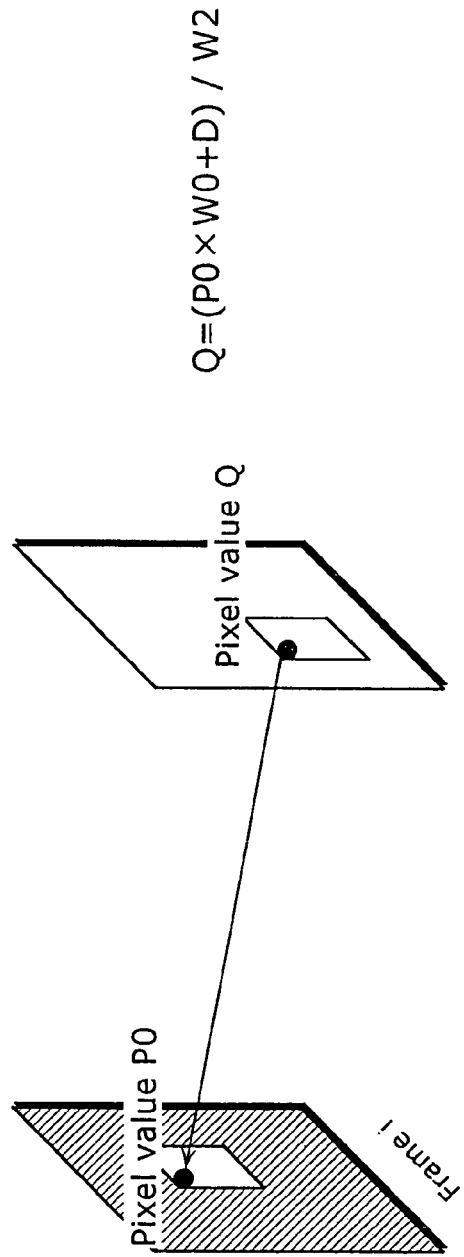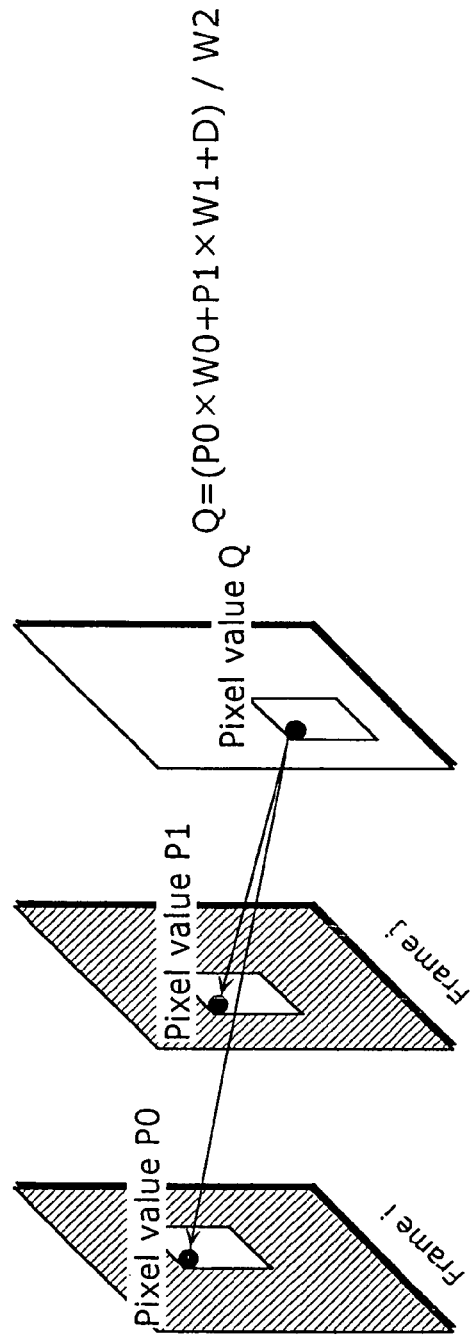

$Qa = (P0a \times W0a + Da) / W2a$ $Qb = (P0b \times W0b + Db) / W2b$ $Qa = (P0a \times W0a + P1a \times W1a + Da) / W2a$ $Qb = (P0b \times W0b + P1b \times W1b + Db) / W2b$

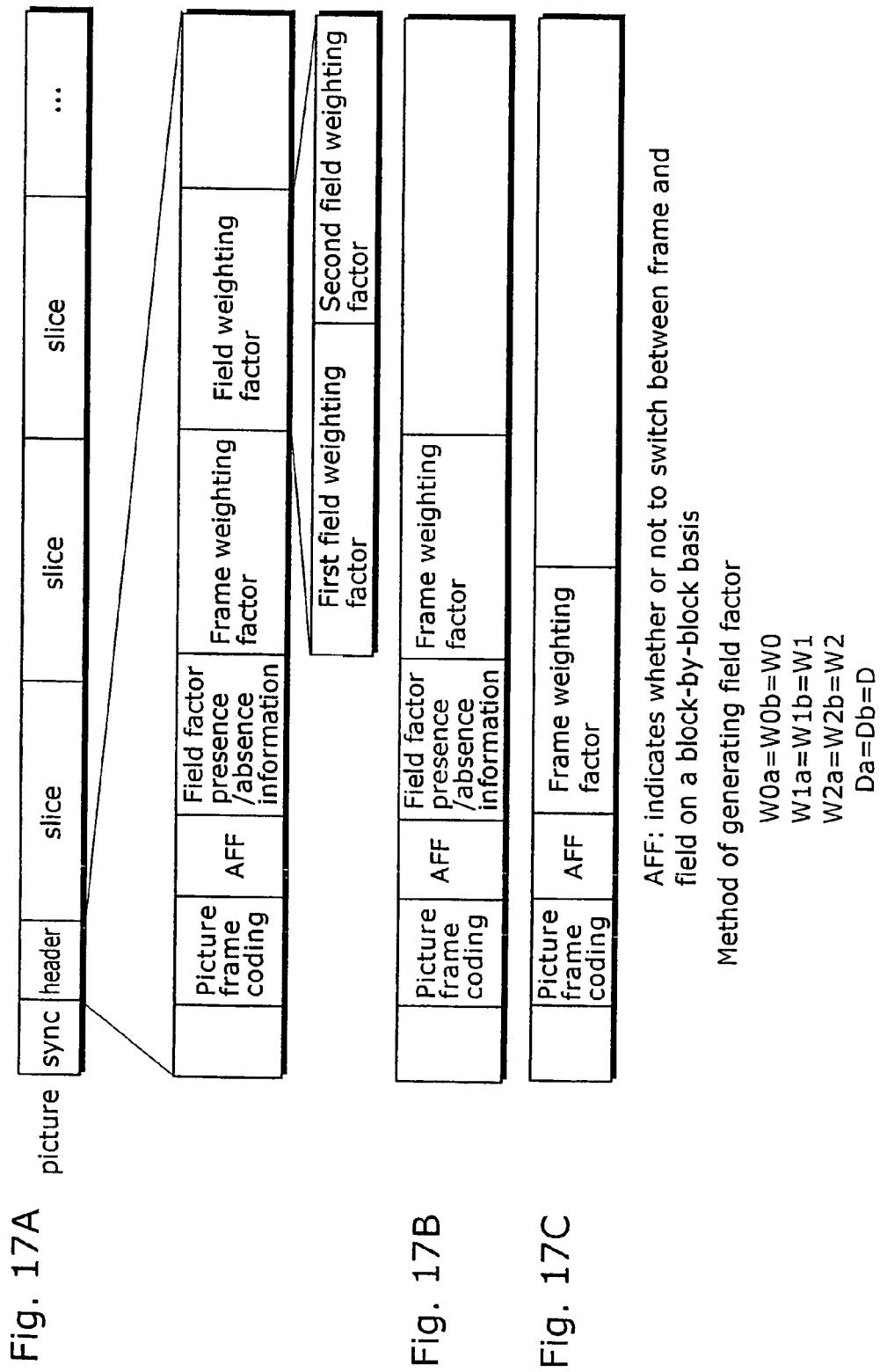

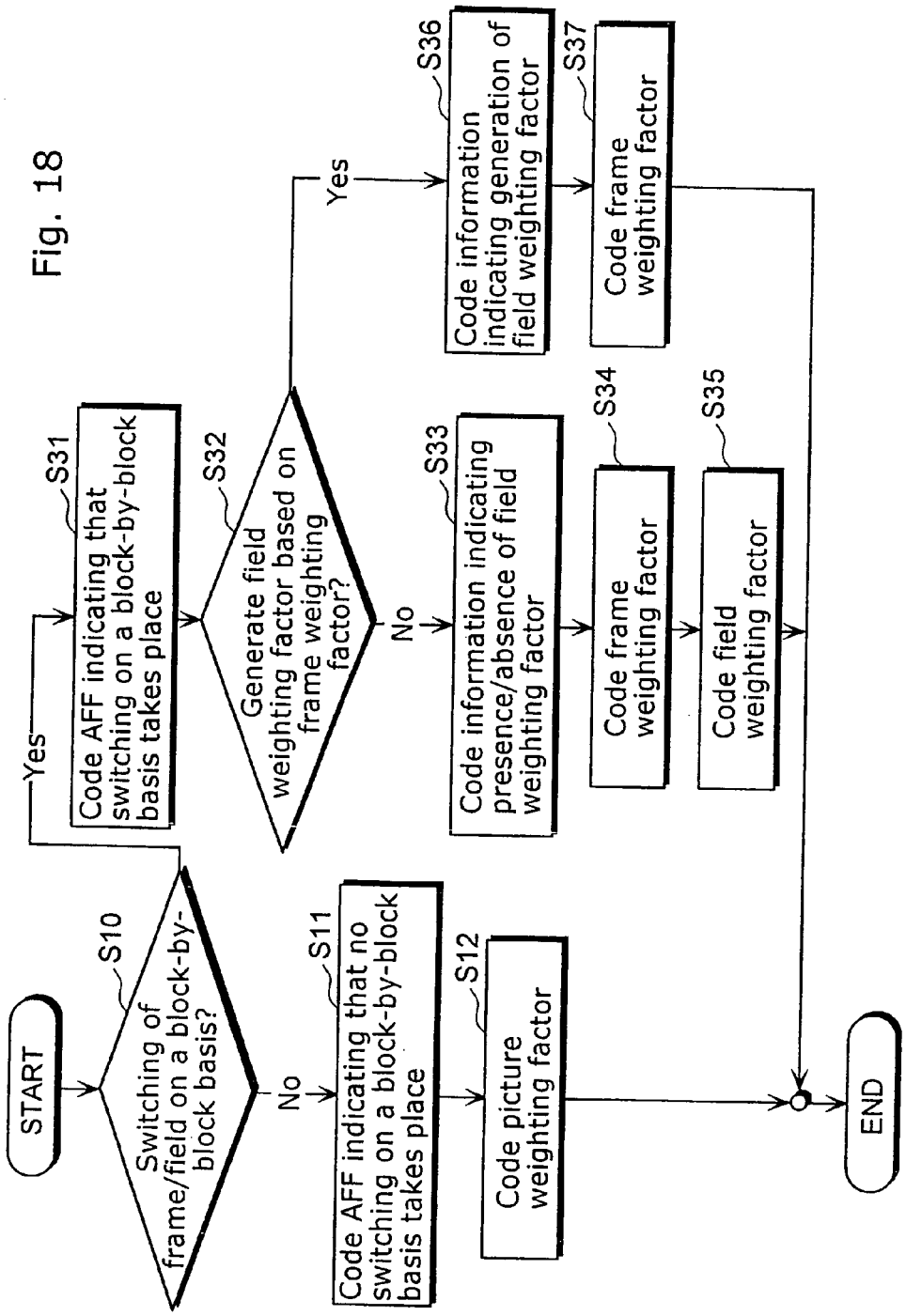

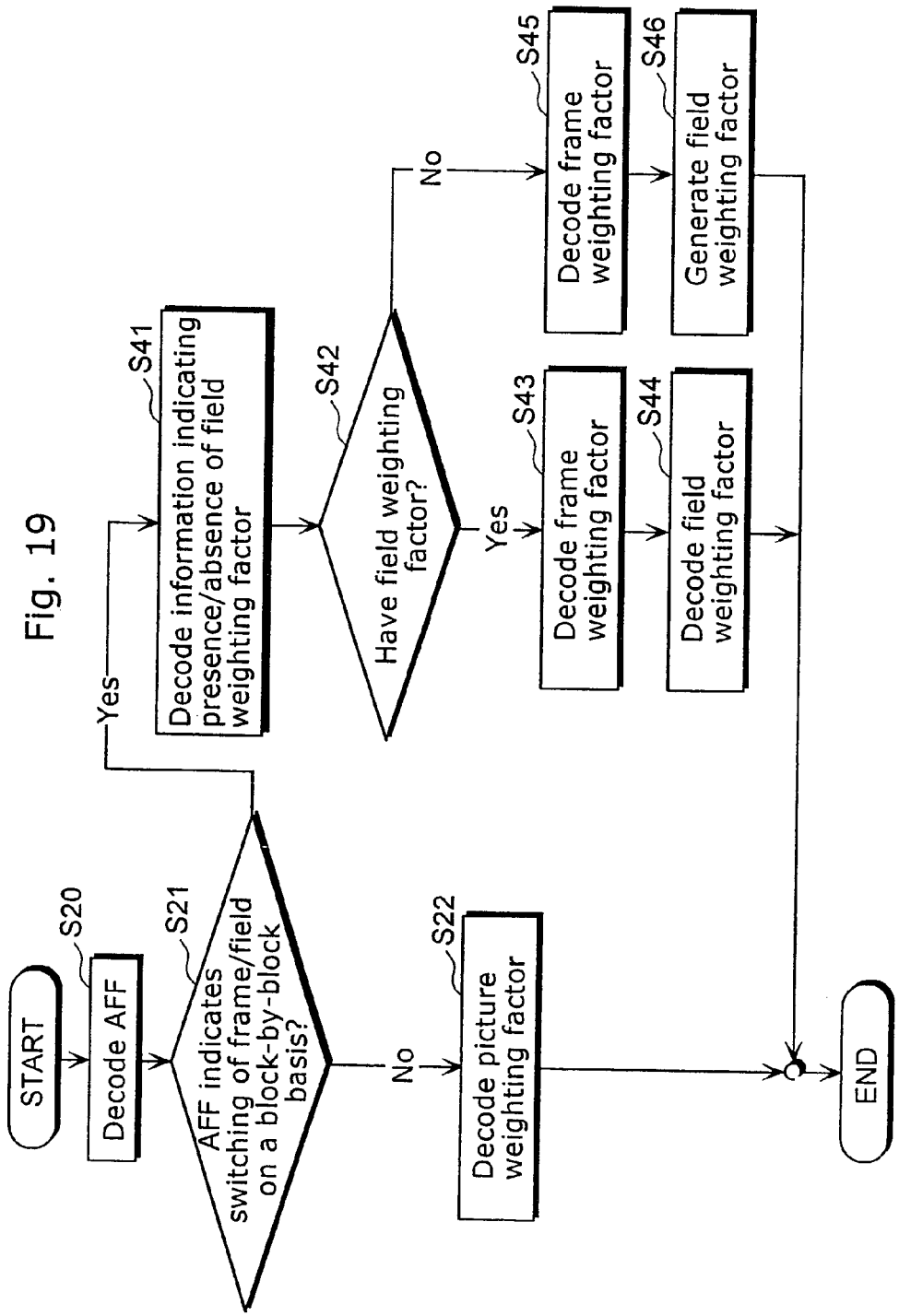

Fig. 20A picture | sync | header | slice | slice | slice | slice | ...

Picture frame coding | AFF | Frame factor presence /absence information | Field weighting factor | Frame weighting factor First field weighting factor | Second field weighting factor

Fig. 20B

Picture frame coding | AFF | Frame factor presence /absence information | Field weighting factor

Fig. 20C

Picture frame coding | AFF | Frame weighting factor

AFF: indicates whether or not to switch between frame and field on a block-by-block basis Method of generating frame factor
W0=(W0a+W0b)/2
W1=(W1a+W1b)/2
W2=(W2a+W2b)/2
D=(Da+Db)/2

When only field is found, the weight of the field is considered as a weight of a frame

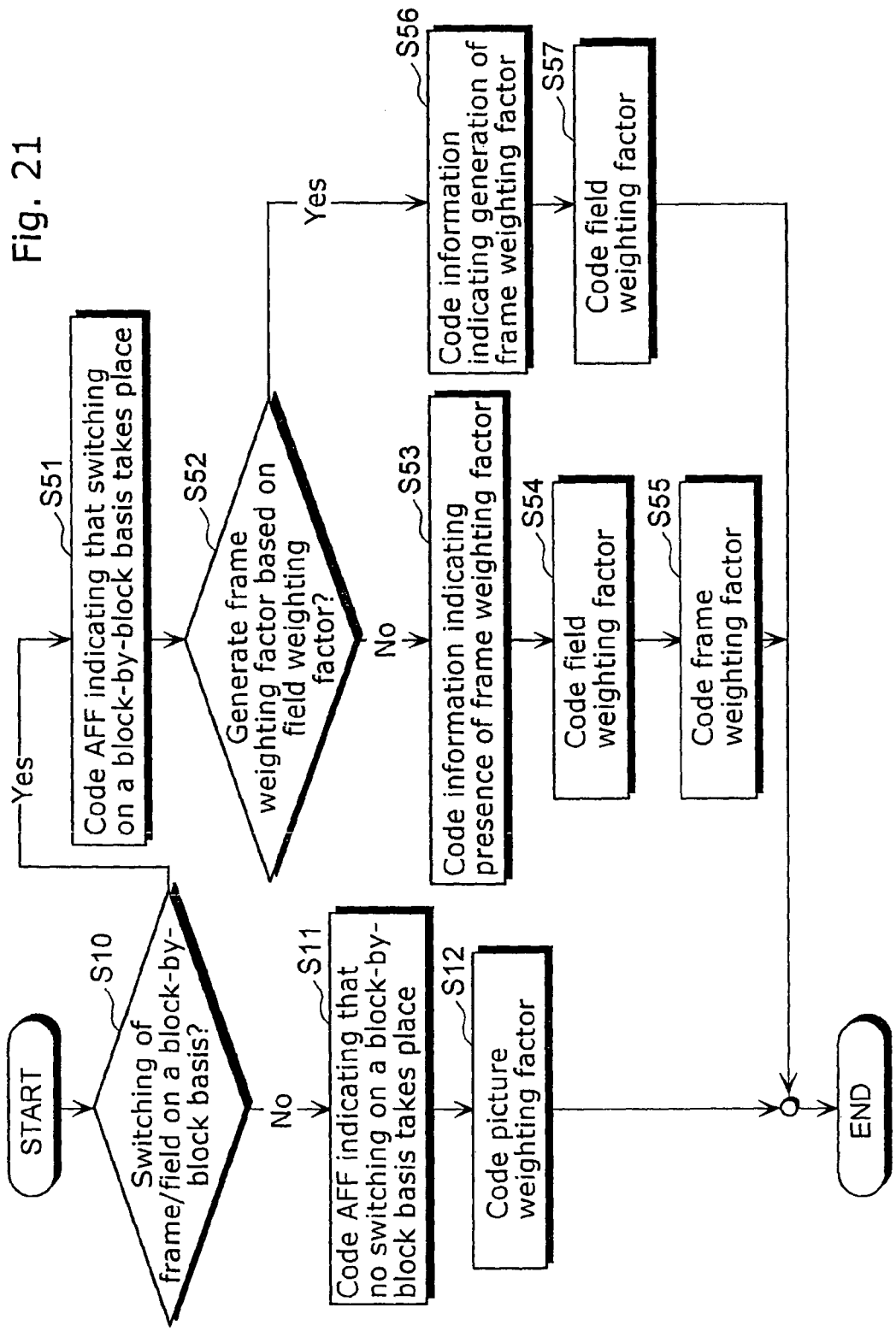

PICTURE CODING APPARATUS, PICTURE DECODING APPARATUS AND THE METHODS

This application is a Divisional of application Ser. No. 10/491,174, filed Mar. 30, 2004 now U.S. Pat. No. 7,864,838 which is the National Stage of International Application No. PCT/JP03/12053, filed Sep. 22, 2003.

BACKGROUND OF THE INVENTION

1. Technical Field

The present invention relates to a coding apparatus and a decoding apparatus for coding and decoding moving pictures, especially to a picture coding apparatus and a picture decoding apparatus for performing motion estimation using weighting factors and the methods thereof.

2. Background Art

Recently, with an arrival of the age of multimedia which handles integrally audio, picture, other contents or the like, it is now possible to obtain or transmit the information conveyed by existing information media, i.e., newspapers, journals, TVs, radios and telephones and other means using a single terminal. Generally speaking, multimedia refers to something that is represented in association not only with characters but also with graphics, audio and especially pictures and the like together. However, in order to include the aforementioned existing information media in the scope of multimedia, it appears as a prerequisite to represent such information in digital form.

However, when estimating the amount of information contained in each of the aforementioned information media as the amount of digital information, the information amount per character requires 1~2 bytes whereas the audio requires more than 64 Kbits (telephone quality) per second and when it comes to the moving picture, it requires more than 100 Mbits (present television reception quality) per second. Therefore, it is not realistic to handle the vast information directly in digital form via the information media mentioned above. For example, a videophone has already been put into practical use via Integrated Services Digital Network (ISDN) with a transmission rate of 64 Kbps ~1.5 Mbps, however, it is not practical to transmit the moving picture captured on the TV screen or shot by a TV camera.

This therefore requires information compression techniques, and for instance, moving picture compression techniques compliant with H.261 and H.263 standards internationally standardized by ITU-T (International Telecommunication Union-Telecommunication Standardization Sector) are used in the case of the videophone. According to information compression techniques compliant with the MPEG-1 standard, picture information as well as music information can be stored in an ordinary music CD (Compact Disc).

The MPEG (Moving Picture Experts Group) is an international standard for compression of moving picture signals and MPEG-1 is a standard that compresses moving picture signals down to 1.5 Mbps, that is, to compress information of TV signals approximately down to a hundredth. The transmission rate within the scope of the MPEG-1 standard is limited primarily to about 1.5 Mbps, therefore, MPEG-2, which was standardized with the view to meet the requirements of high-quality pictures, allows a data transmission of moving picture signals at a rate of 2~15 Mbps. In the present circumstances, a working group (ISO/IEC JTC1/SC29/WG11) in the charge of the standardization of the MPEG-1 and the MPEG-2 has standardized MPEG-4 that achieves a compression rate which goes beyond the one achieved by the MPEG-1 and the MPEG-2, realizes coding/decoding operations on a per-object basis as well as a new function required by the age of multimedia (see reference, for instance, to the specifications of the MPEG-1, MPEG-2 and MPEG-4 produced by the ISO). The MPEG-4 not only realizes a highly efficient coding method for a low bit rate but also introduces powerful error resistance techniques that can minimize a degrading of a screen quality even when an error is found in a transmission line. Also, the ISO/IEC and ITU work together on a standardization of MPEG-4 AVC/ITU H.264 as a next generation picture coding method.

Coding of moving pictures, in general, compresses information volume by reducing redundancy in both temporal and spatial directions. Therefore, inter-picture prediction coding, which aims at reducing the temporal redundancy, estimates a motion and generates a predictive picture on a block-by-block basis with reference to previous and subsequent pictures vis-à-vis a current picture to be coded, and then codes a differential value between the obtained predictive picture and the current picture. Here, the term "picture" represents a single screen whereas it represents a frame when used in a context of progressive picture as well as a frame or a field in a context of an interlaced picture. The interlaced picture here is a picture in which a single frame includes two fields having different time. In the process of coding and decoding the interlaced picture, three ways are possible: handling a single frame either as a frame, as two fields or as a frame structure or a field structure depending on a block in the frame.

FIG. 1 is a diagram showing an example of types of pictures and how the pictures refer to each other. The hatched pictures in FIG. 1 are pictures to be stored in a memory since they are referred to by other pictures. As for the arrows used in FIG. 1, the head of the arrow points at a reference picture departing from a picture that refers to the reference picture. Here, the pictures are in display order.

I0 (Picture 0) is an intra-coded picture (I-picture) which is coded independently from other pictures (namely without referring to other pictures). P4 (Picture 4) and P7 (Picture 7) are forward prediction coded pictures (P-picture) that are predictively coded with reference to I-pictures located temporally previous to the current picture or other P-pictures. B1~B3 (Pictures 1~3), B5 (Picture 5) and B6 (Picture 6) are bi-directional prediction coded pictures (B-picture) that are predictively coded with reference to other pictures both temporally previous and subsequent to the current picture.

FIG. 2 is a diagram showing another example of the types of pictures and how the pictures refer to each other. The difference between FIG. 2 and FIG. 1 is that a temporal position of the pictures referred to by a B-picture is not limited to the pictures that are located temporally previous and subsequent to the B-picture. For example, the B5 can refer to two arbitrary pictures out of I0 (Picture 0), P3 (Picture 3) and P6 (Picture 6). Namely, the I0 and the P3, located temporally previously can be used as reference pictures. Such a reference method is already acknowledged in the specification of the MPEG-4 AVC/H.264 as of September 2001. Thus, a range for selecting an optimal predictive picture is widened and thereby the compression rate can be improved.

FIG. 3 is a diagram showing an example of a stream structure of picture data. As shown in FIG. 3, the stream includes a common information area such as a header or the like and a GOP (Group Of Picture) area. The GOP area includes a common information area such as a header or the like and a plurality of picture areas. The picture area includes a common information area such as a header or the like and a plurality of slice data areas. The slice data area includes a common information area such as a header and a plurality of macroblock data areas.

In the picture common information area, the weighting factor necessary for performing weighted prediction to be mentioned later are described respectively according to the reference picture.

When transmitting data not in a bit stream having successive streams but in a packet that is a unit including pieces of data, the header part and the data part which excludes the header part can be transmitted separately. In this case, the header part and the data part cannot be included in a single bit stream. In the case of using a packet, however, even when the header part and the data part are not transmitted in sequence, the data part and the header part are transmitted respectively in a different packet. Although they are not transmitted in a bit stream, the concept is the same as in the case of using a bit stream as described in FIG. 3.

The following describes weighted prediction processing carried out by the conventional picture coding method.

FIGS. 4A and 4B are pattern diagrams showing cases of performing weighted prediction on a frame-by-frame basis.

When referring to a single frame, as shown in FIG. 4A, a pixel value Q in a predictive picture with respect to a current block to be coded can be calculated using an equation for weighted prediction as shown in equation (1) below, where a pixel value within a reference block in the i th number of reference frame, Frame i, is represented as P0. When referring to two frames, as shown in FIG. 4B, the pixel value Q in the predictive picture can be calculated using an equation for weighted prediction as shown in equation (2) below, where respective pixel values within the reference blocks in the i th and j th numbers of reference frames, Frame i and Frame j, are represented as P0 and P1.

$$Q = (P0 \times W0 + D)/W2 \quad (1)$$

$$Q = (P0 \times W0 + P1 \times W1 + D)/W2 \quad (2)$$

Here, W0 and W1 represent weighting factors whereas W2 represents a normalization factor and D represents a biased component (DC component).

FIGS. 5A and 5B are pattern diagrams showing cases of performing weighted prediction processing on a field-by-field basis.

When referring to a single frame (namely, two fields) as shown in FIG. 5A, pixel values Qa and Qb in the predictive pictures with respect to a current block can be calculated using equations for weighted prediction as shown in equations (3) and (4) below, where pixel values within respective reference blocks in respective fields of $2xi+1$ and $2xi$, composing the i th number of frame (Frame i) which is for reference, are represented as P0a and P0b. When referring to two frames, as shown in FIG. 5B, the pixel values Qa and Qb can be calculated by using equations for weighted prediction as shown in equations (5) and (6) below, where pixel values within the respective reference blocks in field $2xi+1$, $2xi$, $2xj+1$ and $2xj$, composing the i th and j th number of frames (Frame and Frame j) are represented respectively as P0a, P0b, P1a and P1b.

$$Qa = (P0a \times W0a + Da)/W2a \quad (3)$$

$$Qb = (P0b \times W0b + Db)/W2b \quad (4)$$

$$Qa = (P0a \times W0a + P1a \times W1a + Da)/W2a \quad (5)$$

$$Qb = (P0b \times W0b + P1b \times W1b + Db)/W2b \quad (6)$$

Here, W0a, W0b, W1a and W1b represent weighting factors whereas W2 represents a normalization factor and Da and Db represent biased components.

FIG. 6 is a block diagram showing a functional structure of a conventional picture coding apparatus 100. The picture coding apparatus 100 performs compression coding (for example, variable length coding) for an inputted image signal Vin and outputs a coded image signal Str that is a bit stream converted by the compression coding, and includes a motion estimation unit ME, a motion compensation unit MC, a substraction unit Sub, an orthogonal transformation unit T, a quantization unit Q, an inverse quantization unit IQ, an inverse orthogonal transformation unit IT, an addition unit Add, a picture memory PicMem, a switch SW and a variable length coding unit VLC.

The image signal Vin is inputted to the substraction unit Sub and the motion estimation unit ME. The substraction unit Sub calculates a differential value between the inputted image signal Vin and the predictive image and outputs the result to the orthogonal transformation unit T. The orthogonal transformation unit T transforms the differential value to a frequency coefficient and then outputs it to the quantization unit Q. The quantization unit Q quantizes the inputted frequency coefficient and outputs a quantized value to the variable length coding unit VLC.

The inverse quantization unit IQ reconstructs the quantized value as a frequency coefficient by inverse-quantizing it and outputs it to the inverse orthogonal transformation unit IT. The inverse orthogonal transformation unit IT performs inverse frequency conversion to the frequency coefficient in order to obtain a pixel differential value and outputs it to the addition unit Add. The addition unit Add adds the pixel differential value to the predictive image outputted from the motion compensation unit MC and obtains a decoded image. The switch SW is ON when it is instructed to store the decoded image, and the decoded image is stored in the picture memory PicMem.

The motion estimation unit ME, to which the image signal Vin is inputted on a macroblock-by-macroblock basis, targets the decoded pictures stored in the picture memory PicMem for search, and by estimating an image area according to the image signal that is the closest to the inputted image signal, determines a motion vector MV that indicates the area. The estimation of the motion vector is operated using a block that is a unit made by further dividing a macroblock. Since multiple pictures can be used as reference pictures, identification numbers (picture number index) for identifying the pictures used for reference are required for each block. It is thus possible to identify the reference pictures by corresponding the picture numbers assigned to each of the pictures in the picture memory PicMem to the reference pictures with the use of the picture number Index.

The motion compensation unit MC takes out an image area necessary for generating a predictive image from a decoded picture stored in the picture memory PicMem using the picture number Index. The motion compensation unit MC then determines a final predictive image obtained by performing, to the pixel values in the obtained image area, pixel value conversion processing such as interpolating processing operated in the weighted prediction using the weighting factors associated with the picture number Index.

FIG. 7 is a block diagram showing a sketch of a functional structure of the variable length coding unit VLC in the conventional picture coding apparatus 100 shown in FIG. 6. The variable length coding unit VLC includes an MV coding unit 101, a quantized value coding unit 102, a weighting factor coding unit 103, an index coding unit 104, an AFF (Adaptive Field Frame) identifying information coding unit 105 and a multiplexing unit 106.

The MV coding unit 101 codes a motion vector whereas the quantized value coding unit 102 codes a quantized value Qcoef. The weighting factor coding unit 103 codes a weighting factor Weight whereas the index coding unit 104 codes a picture number Index. The AFF identifying information coding unit 105 codes an AFF identification signal AFF (the AFF identification signal AFF will be mentioned later on). The multiplexing unit 106 multiplexes each of the coded signals outputted from the MV coding unit 101, the quantized value coding unit 102, the weighting factor coding unit 103, the index coding unit 104 and the AFF identifying information coding unit 105 and then outputs a coded image signal Str.

FIG. 8 is a block diagram showing a functional structure of a conventional picture decoding apparatus 200.

The picture decoding apparatus 200 for decoding the coded image signal Str coded by the picture coding apparatus 100 described above includes a variable length decoding unit VLD, a motion compensation unit MC, an addition unit Add, a picture memory PicMem, an inverse quantization unit IQ and an inverse orthogonal transformation unit IT.

When the coded image signal Str is inputted, the variable length decoding unit VLD demultiplexes the inputted coded image signal Str into a motion differential vector MV that is coded, an index indicating a picture number and a weighting factor Weight and outputs them to the motion compensation unit MC. The variable length decoding unit VLD then decodes the coded quantized value Qcoef included in the inputted coded image signal Str and outputs it to the inverse quantization unit IQ.

The motion compensation unit MC takes out an image area necessary for generating a predictive image from a decoded picture stored in the picture memory PicMem using the motion vector and the picture number Index which are outputted from the variable length decoding unit VLD. The motion compensation unit MC then generates a predictive image by performing pixel value conversion processing such as interpolating processing in the weighted prediction using the weighting factor Weight for the obtained image.

The inverse quantization unit IQ inverse-quantizes the quantized value and reconstructs it as a frequency coefficient and outputs it to the inverse orthogonal transformation unit IT. The inverse orthogonal transformation unit IT performs inverse frequency conversion to the frequency coefficient in order to obtain a pixel differential value and outputs it to the addition unit Add. The addition unit Add adds the pixel differential value to the predictive image outputted from the motion compensation unit MC and obtains a decoded image. The decoded picture is stored in the picture memory PicMem to be used for reference in the inter-picture prediction. The decoded picture is outputted as a decoded picture signal Vout.

FIG. 9 is a block diagram showing a sketch of a functional structure of a variable length decoding unit VLD in the conventional picture decoding apparatus 200 shown in FIG. 8.

The variable length decoding unit VLD includes a demultiplexing unit 201, an MV decoding unit 202, a quantized value decoding unit 203, a weighting factor decoding unit 204, an index decoding unit 205 and an AFF identification signal decoding unit 206.

When the coded image signal Str is inputted to the variable length decoding unit VLD, the demultiplexing unit 201 demultiplexes the inputted coded image signal Str and outputs respectively as follows: the coded motion differential vector MV to the MV decoding unit 202; the coded quantized value Qcoef to the quantized value decoding unit 203; the coded weighting factor Weight to the weighting factor decoding unit 204; the coded picture number to the index decoding unit 205 and the coded AFF identification signal AFF (abbreviated as "AFF" in the following description) to the AFF identification signal decoding unit 206.

The MV decoding unit 202 decodes the coded differential vector and outputs a motion vector MV.

Similarly, the quantized value decoding unit 203 decodes the quantized value, the weighting factor decoding unit 204 decodes the weighting factor Weight, the index decoding unit 205 decodes the picture number Index and the AFF identification signal decoding unit 206 decodes the AFF respectively and then outputs them.

The conventional coding using weighted prediction, however, is performed on a picture-by-picture basis with an assumption that a block is coded/decoded for the same picture (a frame or one of the two fields). Therefore, only a set of weighting factors can be coded/decoded in the picture.

Therefore, in spite that the conventional picture coding apparatus has the potential to improve efficiency in motion estimation, only a single weighting factor can be transmitted on a block-by-block basis and thereby prediction efficiency is low even when the switching of field/frame takes place on a block-by-block basis, and thereby the compression rate can not be improved.

SUMMARY OF INVENTION

The present invention has been conceived in view of the aforementioned circumstances and aims to provide a picture coding/decoding method that can handle weighting factors appropriately even when switching of field/frame takes place on a block-by-block basis.

In order to achieve the above object, the picture coding apparatus according to the present invention codes an interlaced picture on a block-by-block basis, and comprises: a storage unit operable to store a picture that is either a frame or a field decoded after being coded, as a reference picture; a predictive picture generation unit operable to read out the reference picture from the storage unit and generate a predictive picture based on pixel values in the reference picture, using one of i) a frame weighting factor for coding the interlaced picture on a frame-by-frame basis and ii) a field weighting factor for coding the interlaced picture on a field-by-field basis; a signal coding unit operable to code, on a block-by-block basis, a differential value between an inputted picture and the predictive picture generated by the predictive picture generation unit, either on a frame-by-frame basis or on a field-by-field basis; a weighting factor coding unit operable to code the frame weighting factor out of the frame weighting factor and a field weighting factor, when the signal coding unit codes the differential value on a block-by-block basis adaptively either on the frame-by-frame basis or on the field-by-field basis; and a multiplexing unit operable to multiplex the differential value coded by the signal coding unit as well as the frame weighting factor coded by the weighting factor coding unit and output the multiplexed differential value and frame weighting factor, as a coded signal.

Consequently, the picture coding apparatus according to the present invention abbreviates a field weighting factor, codes only a frame weighting factor and transmits it to a picture decoding apparatus, regardless of whether or not the switching of frame/field is performed on a block-by-block basis when performing weighted prediction for a moving picture. Therefore, the transmission efficiency can be improved.

In order to achieve the above object, the picture decoding apparatus according to the present invention decodes, on a block-by-block basis, a coded signal according to a picture that is either a single frame or a single field, and comprises: a signal decoding unit operable to decode the coded signal either on a frame-by-frame basis or on a field-by-field basis, when the coded signal is coded by switching adaptively between the frame-by-frame basis and the field-by-field basis; a storage unit operable to store at least one decoded picture; a predictive picture generation unit operable to extract, from the coded signal, a frame weighting factor for decoding the coded signal on the frame-by-frame basis, generate a field weighting factor for decoding the coded signal on the field-by-field basis, based on the frame weighting factor, and generate a predictive picture based on pixel values in the decoded picture stored in the storage unit, using the extracted frame weighting factor and the generated field weighting factor, when the coded signal is coded by switching adaptively between the frame-by-frame basis and the field-by-field basis; and an addition unit operable to add the picture obtained in the decoding performed by the signal decoding unit to the predictive picture generated by the predictive picture generation unit, output the added picture as a decoded picture, and store the decoded picture in the storage unit.

Consequently, the picture decoding apparatus according to the present invention generates the field weighting factor based on the frame weighting factor even when the switching of frame/field on a block-by-block basis takes place and the field weighting factor is not transmitted. This realizes the adaptive switching of frame/field on a block-by-block basis and improves the transmission efficiency.

In order to achieve the above object, the picture coding method according to the present invention codes an input interlaced picture with reference to at least one decoded picture, and comprises the steps of: generating a predictive picture using a prediction equation weighted by predetermined weighting factors, with reference to the decoded picture; generating a first coded signal by coding a differential picture between the input interlaced picture and the predictive picture adaptively either on a field-by-field basis or on a frame-by-frame basis; generating a decoded picture by decoding said coded signal and adding the decoded coded signal to the differential picture; and generating a second coded signal by coding the predetermined weighting factors in the respective ways, on the field-by-field basis or on the frame-by-frame basis, when the differential picture between the input interlaced picture and the predictive picture is coded adaptively either on the frame-by-frame basis or on the field-by-field basis.

The weighting factors operated on a field-by-field basis may be the weighting factors of both a first field and a second field.

In order to achieve the above object, the picture coding method according to the present invention codes an input interlaced picture with reference to at least one decoded picture, and comprises the steps of: generating a predictive picture using a prediction equation weighted by predetermined weighting factors, with reference to the decoded picture; generating a first coded signal by coding adaptively a differential picture between the input interlaced picture and the predictive picture either on a frame-by-frame basis or on a field-by-field basis; generating a second coded signal for coding identification information indicating whether to code the predetermined weighting factors both on the field-by-field basis and on the frame-by-frame basis or to code the predetermined weighting factors either on the field-by-field basis or on the frame-by-frame basis; and generating a third coded signal by coding the predetermined weighting factors according to the identification information.

In order to achieve the above object, the picture decoding method according to the present invention decodes a coded signal, which is a coded input interlaced picture, with reference to at least one decoded picture, and comprises, when the input interlaced picture is coded adaptively either on a frame-by-frame basis or on a field-by-field basis, the steps of: obtaining weighting factors coded on a field-by-field basis and on a frame-by-frame basis by decoding the coded signal; generating a predictive picture using a prediction equation weighted by the weighting factors, with reference to the decoded picture; generating a differential picture by decoding the coded signal either on a frame-by-frame basis or on a field-by-field basis; and generating a decoded picture by adding the predictive picture to the differential picture.

The weighting factors coded on a field-by-field basis may be the weighting factors of both a first field and a second field.

In order to achieve the above object, the picture decoding method according to the present invention decodes a coded signal, which is a coded input interlaced picture, with reference to at least one decoded picture, and comprises, when a differential picture between the input interlaced picture and the predictive picture is coded adaptively either on a frame-by-frame basis or on a field-by-field basis, the steps of: obtaining identification information indicating whether to decode the coded signal both on a field-by-field basis and on a frame-by-frame basis or either on the field-by-field basis or on the frame-by-frame basis; obtaining both of the weighting factors by decoding the coded signal, when the obtained identification information indicates that the weighting factors are decoded in both ways, on a field-by-field basis and on a frame-by-frame basis; estimating one of the coded weighting factors based on the weighting factor, which is other weighting factor decoded using the coded signal, when the identification information indicates that the weighting factors are decoded in either way, on a field-by-field basis or on a frame-by-frame basis; generating a predictive picture using a prediction equation weighted by the weighting factors, with reference to the decoded picture; generating a differential picture by decoding the coded signal either on a field-by-field basis or on a frame-by-frame basis; and generating a decoded picture by adding the differential picture to the predictive picture.

In order to achieve the above object, the picture coding apparatus according to the present invention codes an input interlaced picture with reference to at least one decoded picture, and comprises: a unit operable to generate a predictive picture using a prediction equation weighted by predetermined weighting factors, with reference to the decoded picture; a unit operable to generate a first coded signal by coding adaptively a differential picture between the input interlaced picture and the predictive picture either on a frame-by-frame basis or on a field-by-field basis; a unit operable to generate a decoded picture by decoding the coded signal and adding the decoded coded signal to the differential picture; a unit operable to generate a second coded signal by coding the predetermined weighting factors in respective ways, on a field-by-field basis and on a frame-by-frame basis, when the differential picture between the input interlaced picture and the predictive picture is coded adaptively either on the frame-by-frame basis or on the field-by-field basis.

In order to achieve the above object, a picture coding apparatus according to the present invention codes an input interlaced picture with reference to at least one decoded picture, and comprises: a unit operable to generate a predictive picture using a prediction equation weighted by predetermined weighting factors, with reference to the decoded picture; a unit operable to generate a first coded signal by coding adaptively a differential picture between the input interlaced picture and the predictive picture either on a frame-by-frame basis or on a field-by-field basis; a unit operable to generate a decoded picture by decoding the coded signal and adding the decoded coded signal to the differential picture; a unit operable to generate a second coded signal for generating identification information indicating whether to code the predetermined weighting factors both on the field-by-field basis and on the frame-by-frame basis or either on the field-by-field basis or on the frame-by-frame basis; and a unit operable to generate a third coded signal by coding the predetermined weighting factors according to the identification information.

In order to achieve the above object, the picture decoding apparatus according to the present invention decodes a coded signal, which is a coded input interlaced picture, with reference to at least one decoded picture, and comprises, when the input interlaced picture is coded adaptively either on a frame-by-frame basis or on a field-by-field basis: a unit operable to obtain weighting factors operated both on the field-by-field basis and on the frame-by-frame basis, by decoding the coded signal; a unit operable to generate a predictive picture using a prediction equation weighted by the weighting factors, with reference to the decoded picture; a unit operable to generate a differential picture by decoding the coded signal either on a frame-by-frame basis or on a field-by-field basis and generate a decoded picture by adding the differential picture to the predictive picture.

In order to achieve the above object, the picture decoding apparatus according to the present invention decodes a coded signal, which is a coded input interlaced picture, with reference to at least one decoded picture, and comprises, when the input interlaced picture is coded adaptively either on a frame-by-frame basis or on a field-by-field basis: a unit operable to obtain identification information indicating whether to decode weighting factors in both ways, on a field-by-field basis and on a frame-by-frame basis, or to decode the weighting factors in either way, on the field-by-field basis or on the frame-by-frame basis; a unit operable to obtain both of the weighting factors when the obtained identification information indicates that the weighting factors are to be decoded in both ways, on the field-by-field basis and on the frame-by-frame basis; a unit operable to estimate one of the coded weighting factors based on the weighting factor, which is other weighting factor decoded using the coded signal, and generate a predictive picture using a prediction equation weighted by the weighting factors, with reference to the decoded picture, when the obtained identification information indicates that the weighting factors are to be decoded in either way, on the field-by-field basis or on the frame-by-frame basis; a unit operable to generate a differential picture by decoding the coded signal either on the frame-by-frame basis or on the field-by-field basis; and a unit operable to generate a decoded picture by adding the differential picture to the predictive picture.

In order to achieve the above object, the present invention can be realized as a picture coding method and/or a picture decoding method having the characteristic composing units included in each of the above apparatuses as steps and also as a program including all the steps included in these methods. The program can be stored in a ROM included in an apparatus with which above methods can be realized as well as distributed via a storage medium such as a CD-ROM or the like and a transmission medium such as a communication network or the like.

As for further information about technical background to this application, Japanese Patent Application No. 2002-289303 filed on 1 Oct., 2002, is incorporated herein by reference.

BRIEF DESCRIPTION OF DRAWINGS

These and other objects, advantages and features of the invention will become apparent from the following description thereof taken in conjunction with the accompanying drawings that illustrate a specific embodiment of the invention. In the drawings:

FIG. 4A is a pattern diagram for performing weighted prediction processing with reference to a single frame.

FIG. 4B is a pattern diagram for performing weighted prediction processing with reference to two frames.

FIG. 17A is a detailed example of a data structure of a "header" included in a common information area in a picture area according to a second embodiment, in which the "AFF" is set to "1" and "Field factor presence/absence information" is set to "1".

FIG. 17B is a diagram similar to FIG. 17A in which the "AFF" is set to "1" and the "Field factor presence/absence information" is set to "0".

FIG. 17C is an example in which the switching of field/frame does not take place on a block-by-block basis since the "AFF" is set to "0".

FIG. 18 is a flowchart showing a sequence of coding processing with respect to the weighting factors operated by the variable length coding unit according to the second embodiment.

FIG. 19 is a flowchart showing a sequence of decoding processing with respect to the weighting factors operated by the variable length decoding unit according to the second embodiment.

FIG. 20A is a diagram showing an example of a data structure of a picture area, in which the "AFF" is set to "1" and "Frame factor presence/absence information" is set to "1", according to a third embodiment.

FIG. 20B is a diagram similar to FIG. 20A, in which the "AFF" is set to "1" and the "Frame factor presence/absence information" is set to "0".

FIG. 20C is an example in which switching of field/frame does not take place on a block-by-block basis since the "AFF" is set to "0".

FIG. 21 is a flowchart showing a sequence of coding processing with respect to the weighting factors operated by a variable length coding unit according to the third embodiment.

FIG. 23A is an illustration showing a physical format of the flexible disk that is a main body of the recording medium.

FIG. 23B is an illustration showing a full appearance of the flexible disk, a structure at cross section and the flexible disk itself.

FIG. 23C is an illustration showing a structure for recording/reproducing the program onto the flexible disk FD.

DETAILED DESCRIPTION OF THE INVENTION

The following describes embodiments according to the present invention in detail with reference to the diagrams.

FIRST EMBODIMENT

The functional structure of the picture coding apparatus for realizing the picture coding method according to the present embodiment is the same as that of the conventional picture coding apparatus 100 mentioned above, except for the variable length coding unit VLC. Similarly, the functional structure of the picture decoding apparatus for realizing the picture decoding method according to the present embodiment is the same as that of the conventional picture decoding apparatus 200 mentioned above, except for the variable length decoding unit VLD.

Therefore, the following focuses mainly on the descriptions of a variable length coding unit VLC and a variable length decoding unit VLD which are different from the conventional ones.

Figure 1:
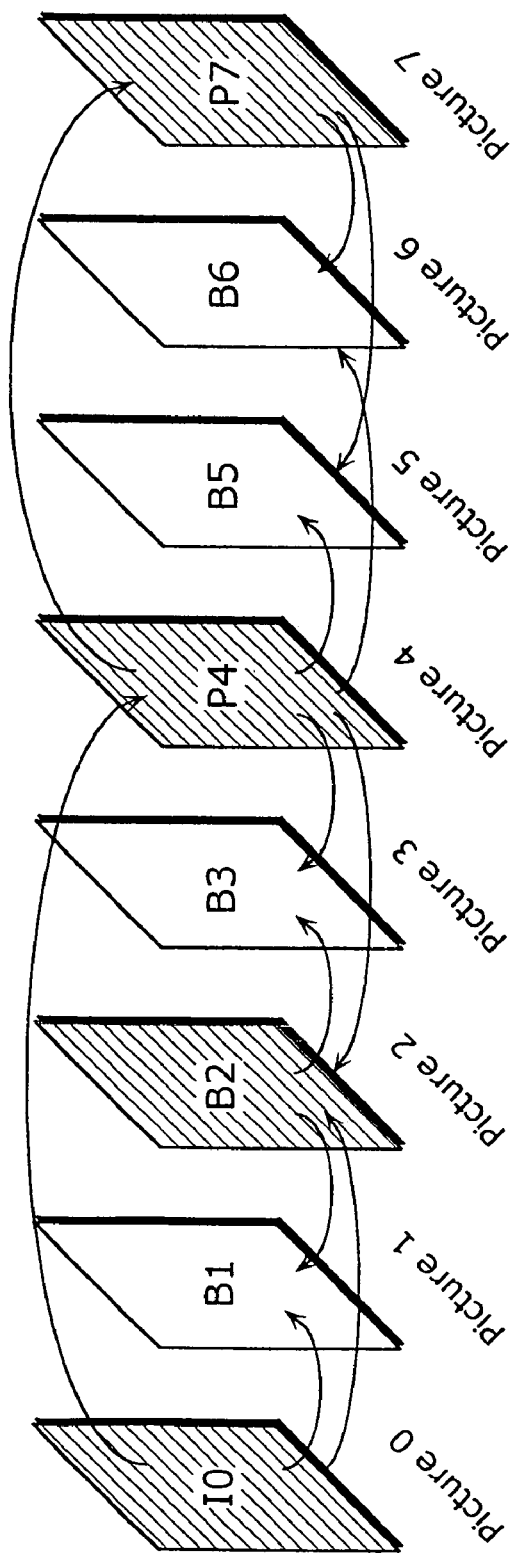
FIG. 1 is a diagram showing an example of types of pictures and their reference relation.
Figure 2:
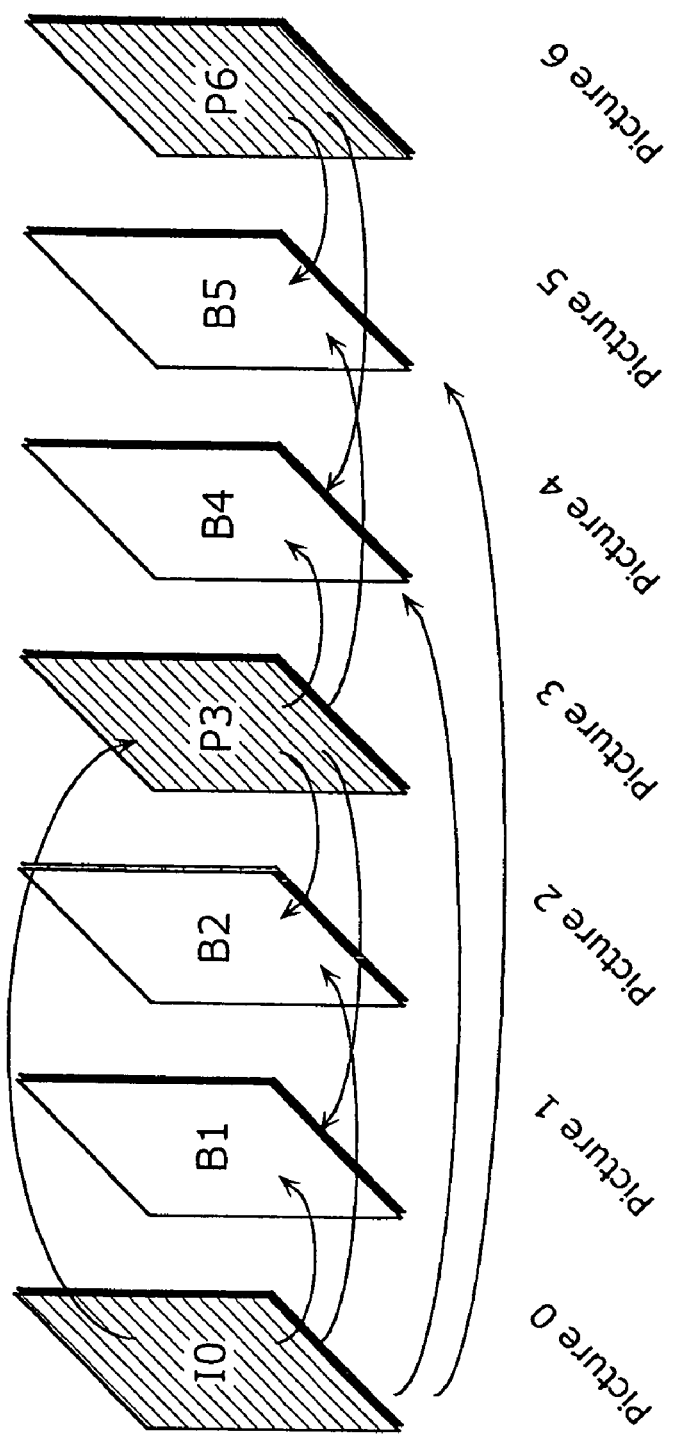
FIG. 2 is a diagram showing another example of the types of pictures and their reference relation.
Figure 3:
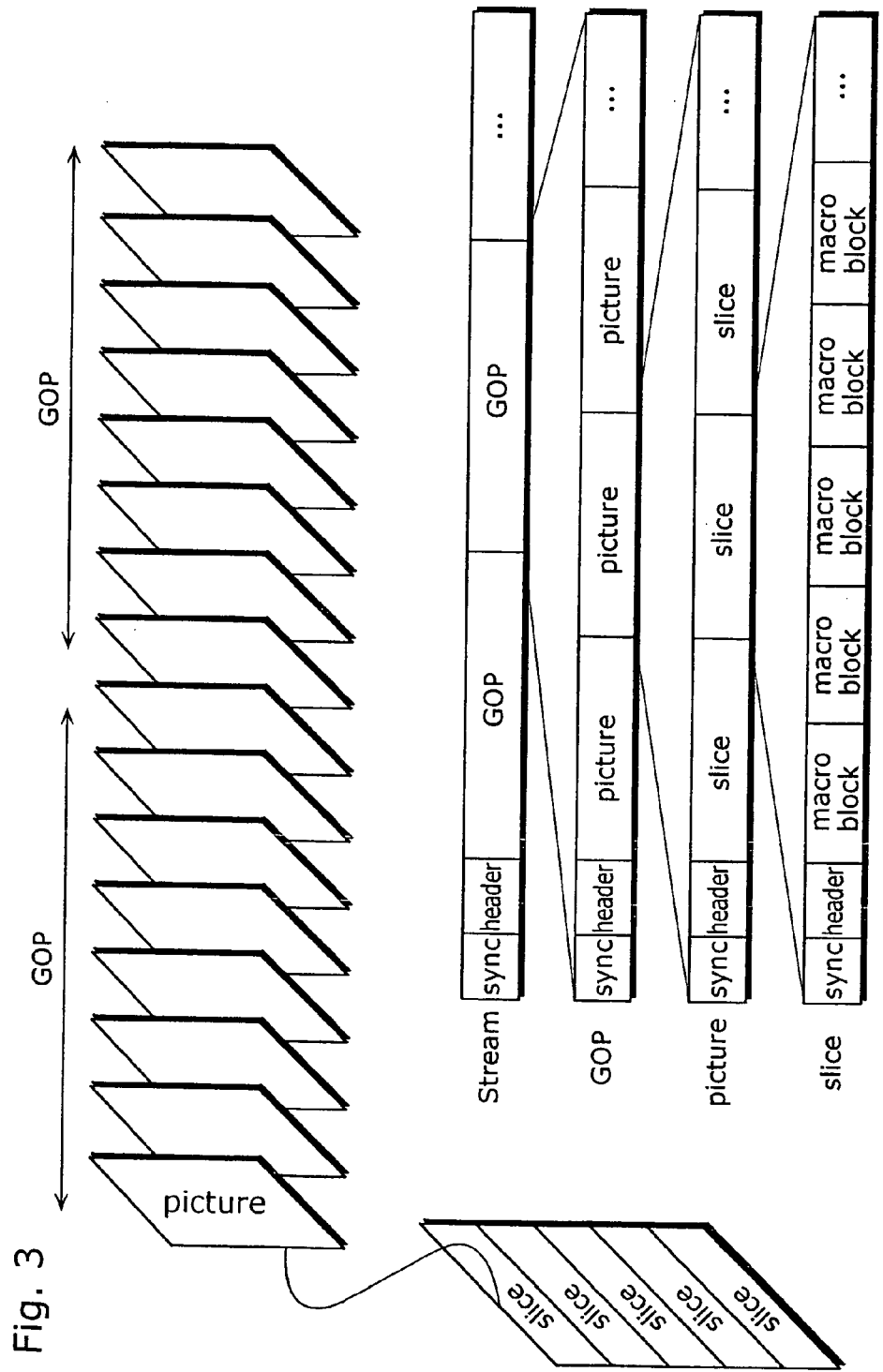
FIG. 3 is a diagram showing an example of a stream structure of picture data.
Figure 5A:
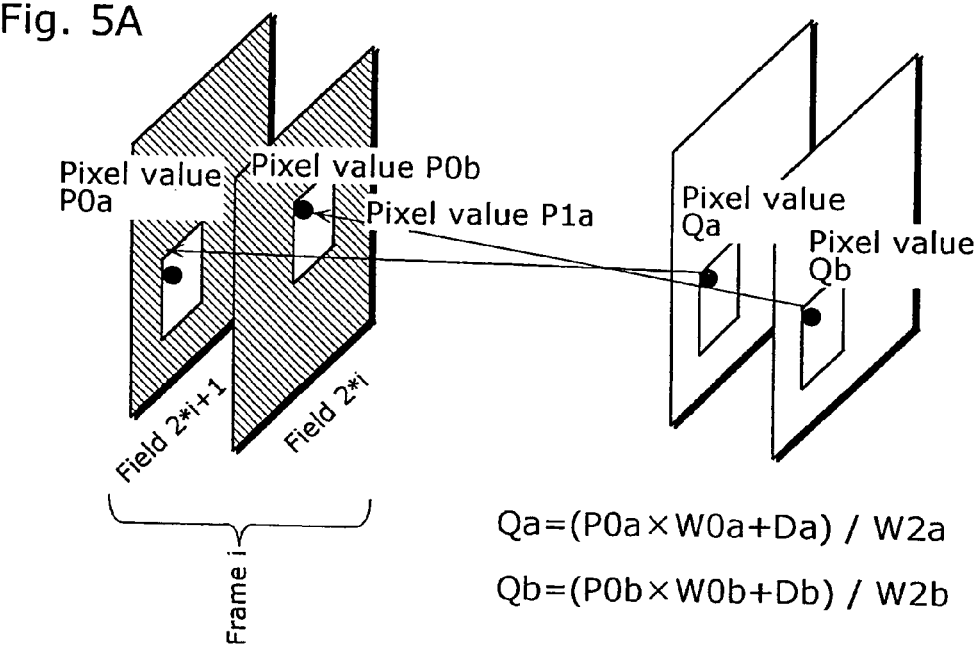
FIG. 5A is a pattern diagram for performing weighted prediction processing with reference to a first or a second field corresponding to a predictive picture with respect to a current picture to be coded.
Figure 5B:
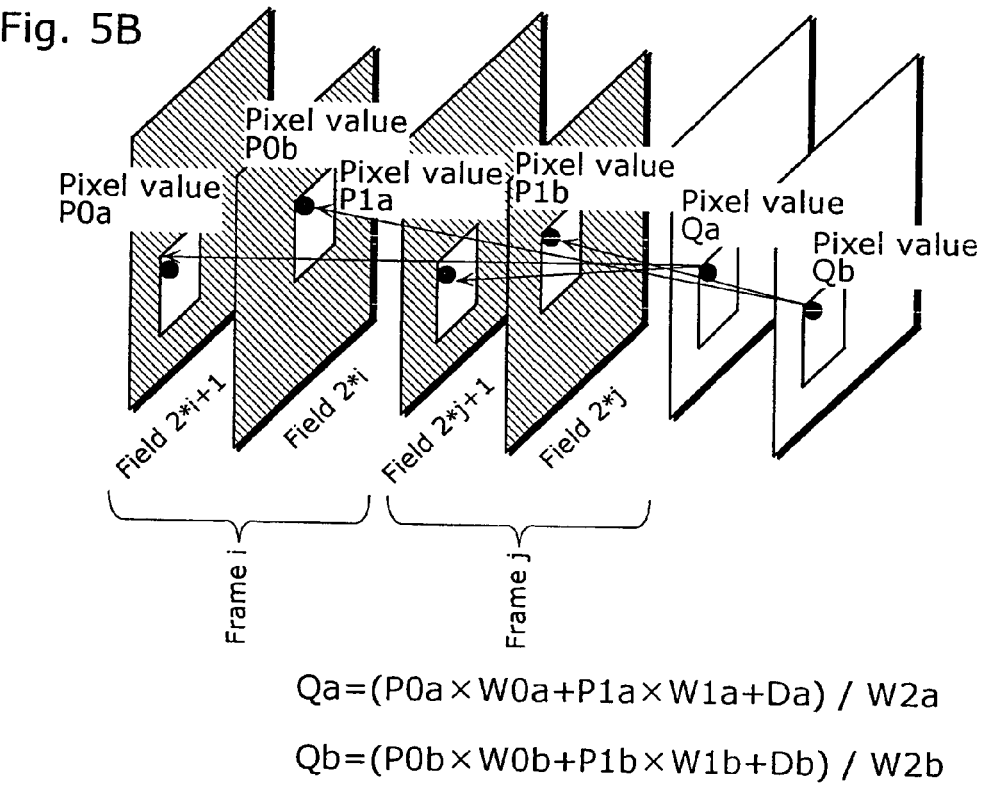
FIG. 5B is a pattern diagram for performing weighted prediction processing with reference to both the first and the second fields corresponding to the predictive picture.
Figure 6:
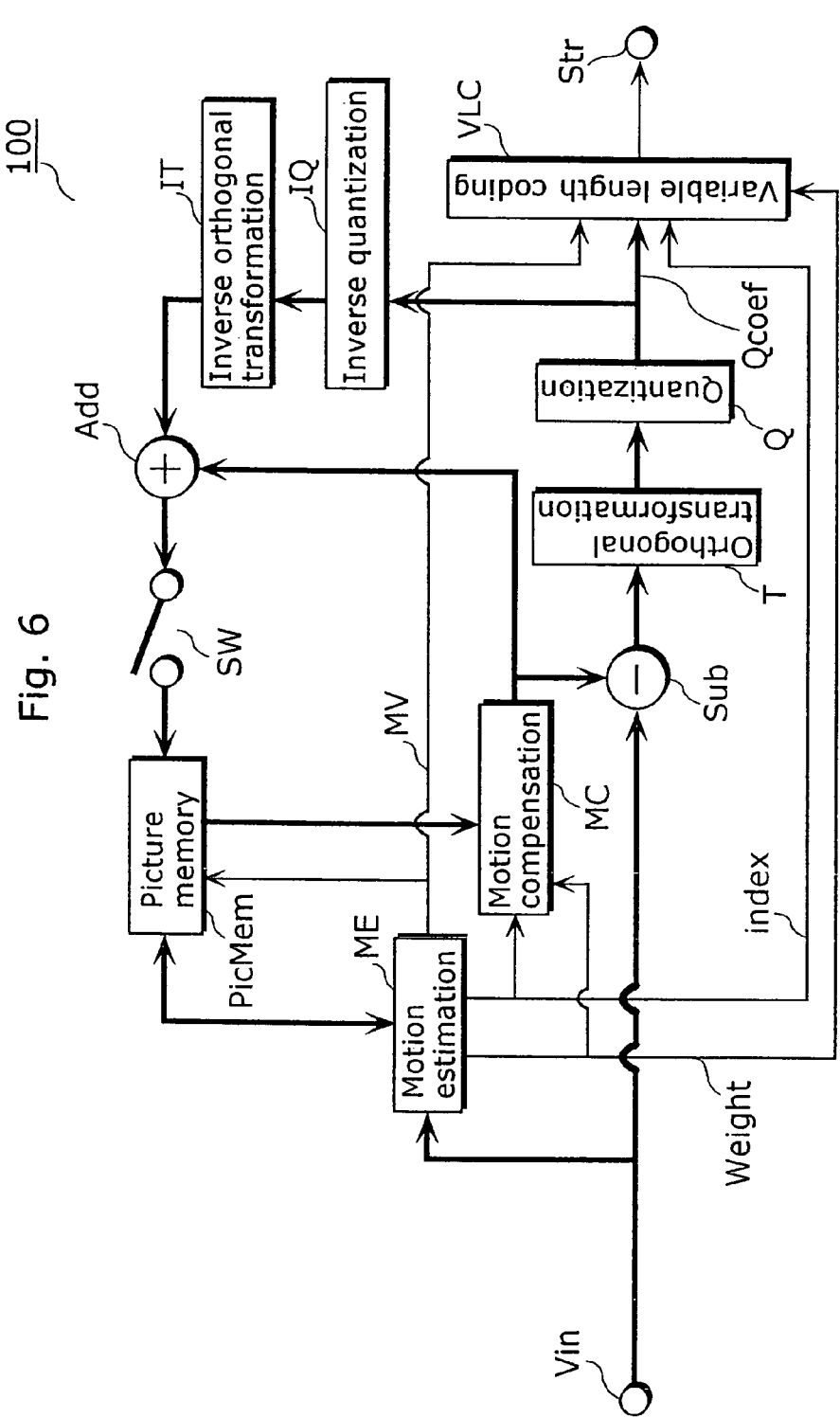
FIG. 6 is a block diagram showing a functional structure of a conventional picture coding apparatus.
Figure 7:
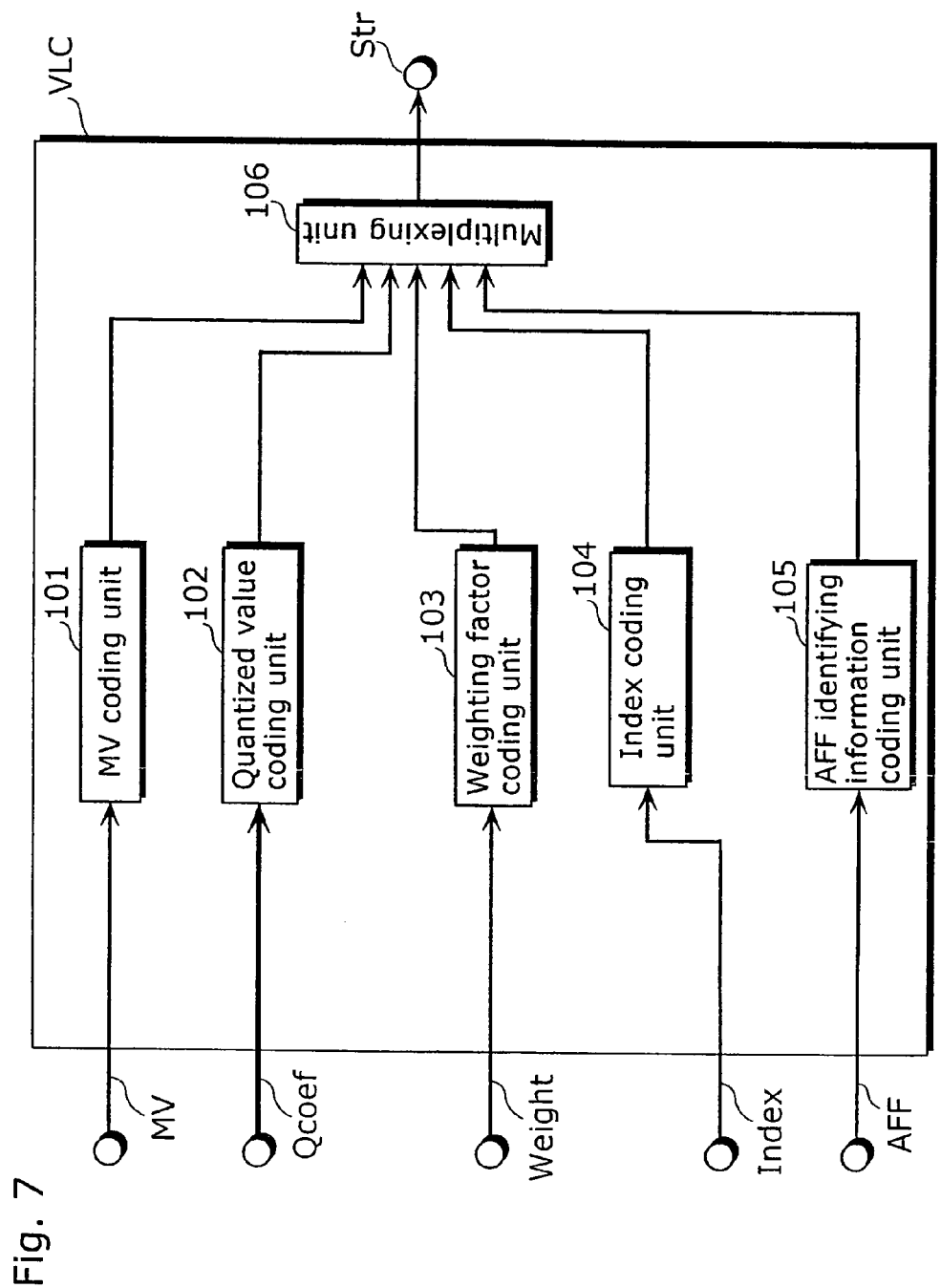
FIG. 7 is a block diagram showing a sketch of a functional structure of a variable length coding unit in the conventional picture coding apparatus.
Figure 8:
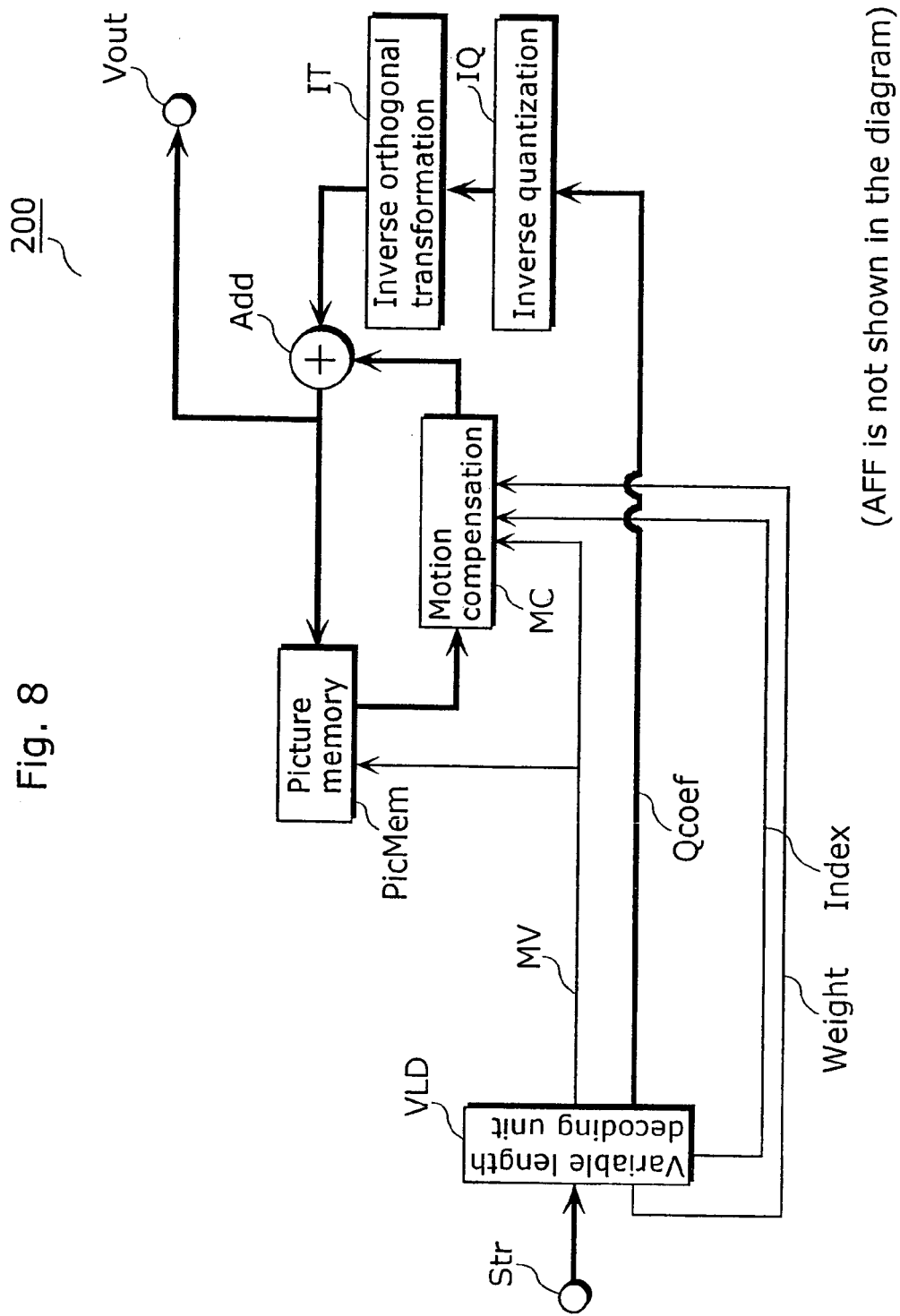
FIG. 8 is a block diagram showing a functional structure of a conventional picture decoding apparatus.
Figure 9:
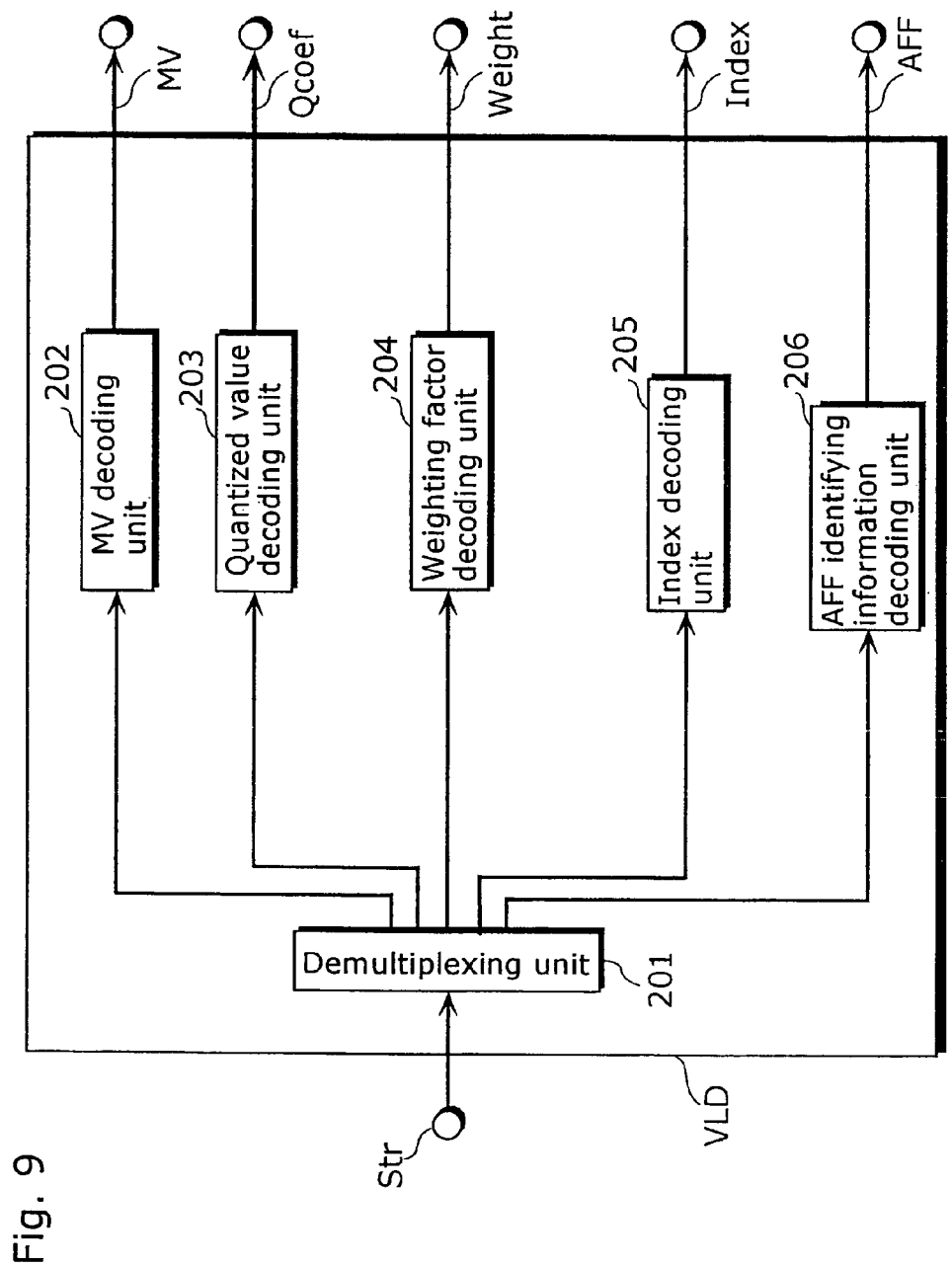
FIG. 9 is a block diagram showing a sketch of a functional structure of a variable length coding unit in the conventional picture decoding apparatus.
Figure 10:
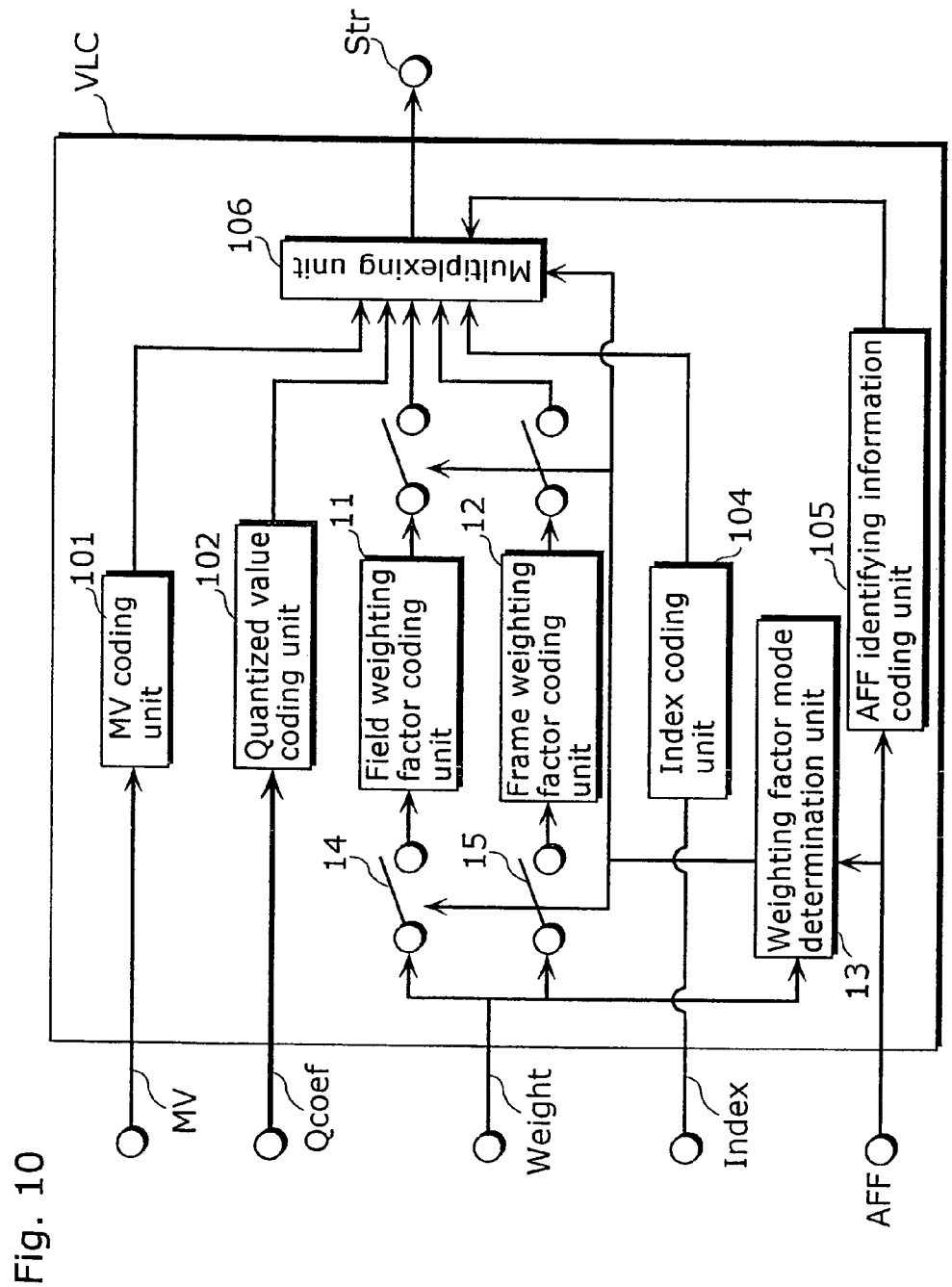
FIG. 10 is a block diagram showing a sketch of a functional structure of a variable length coding unit according to a first embodiment.

FIG. 10 is a block diagram showing a sketch of a functional structure of the variable length coding unit according to the present embodiment. As shown in FIG. 10, the variable length coding unit VLC includes an MV coding unit 101, a quantized value coding unit 102, a field weighting factor coding unit 11, a frame weighting factor coding unit 12, an index coding unit 104, a weighting factor mode determination unit 13, an AFF identifying information coding unit 105, switches 14, 15 and a multiplexing unit 106. The same referential marks are used for the same functional structures as those of the conventional variable length coding unit VLC, and the explanation is thereby abbreviated.

The switches 14 and 15 control ON/OFF by determining the destination of the inputted weighting factor Weight, either to the field weighting factor coding unit 11 or to the frame weighting factor coding unit 12, based on the result of the determination made by the weighting factor mode determination unit 13.

The field weighting factor coding unit 11 codes the inputted weighting factor Weight as a field weighting factor whereas the frame weighting factor coding unit 12 codes it as a frame weighting factor.

The weighting factor mode determination unit 13 performs the determination of frame/field based on the value of the AFF and that of the weighting factor Weight and then informs the switches 14, 15 and the multiplexing unit 106 of the result of the determination.

Figure 11:
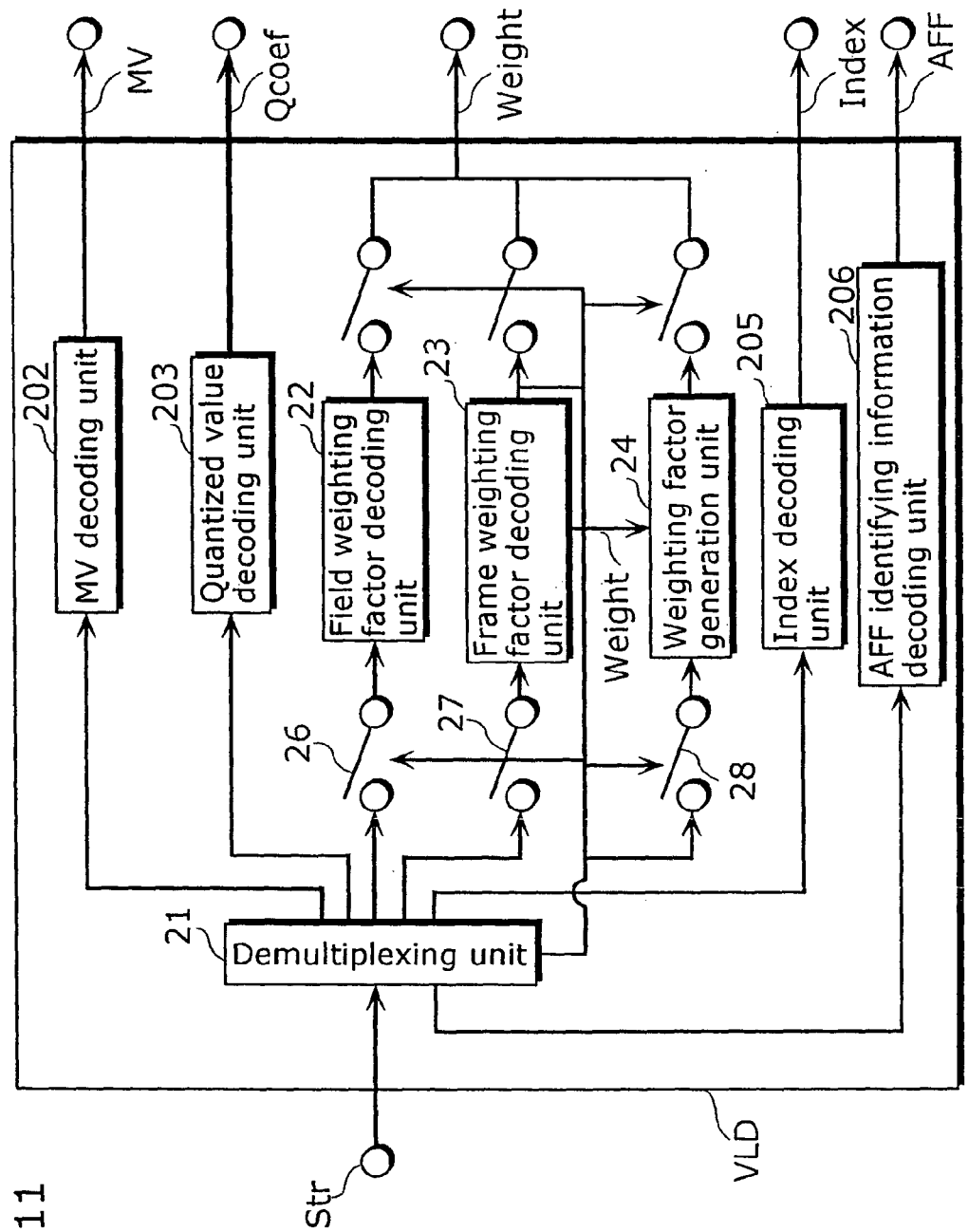
FIG. 11 is a block diagram showing a sketch of a functional structure of a variable length decoding unit according to the first embodiment.

FIG. 11 is a block diagram showing a sketch of a functional structure of the variable length decoding unit VLD according to the present embodiment. As shown in FIG. 11, the variable length decoding unit VLD includes a demultiplexing unit 21, an MV decoding unit 202, a quantized value decoding unit 203, a field weighting factor decoding unit 22, a frame weighting factor decoding unit 23, a weighting factor generation unit 24, an index decoding unit 205, an AFF identifying information decoding unit 206 and switches 26~28. The same referential marks are used for the same functional structures as those of the conventional variable length decoding unit VLD, and the explanation is thereby abbreviated.

The demultiplexing unit 21 demultiplexes the inputted coded image signal Str and outputs the demultiplexed signals respectively as follows: the coded motion vector MV to the MV decoding unit 202; the coded quantized value Qcoef to the quantized value decoding unit 203; the coded weighting factor Weight to the field weighting factor decoding unit 22 or the frame weighting factor decoding unit 23, and the weighting factor generation unit 24; the coded picture number Index to the index decoding unit 205 and the coded AFF to the AFF identifying information decoding unit 206.

The field weighting factor decoding unit 22 decodes the inputted weighting factor Weight as a field weighting factor. The frame weighting factor decoding unit 23 decodes the inputted weighting factor Weight as a frame weighting factor. The weighting factor generation unit 24 generates a field weighting factor based on a frame weighting factor, if necessary. It is a case, for example, in which switching of frame/field on a block-by-block basis takes place and it is necessary to generate a field weighting factor based on a frame weighting factor since a field weighting factor is not coded.

Figures 12A, 12B, 12C:
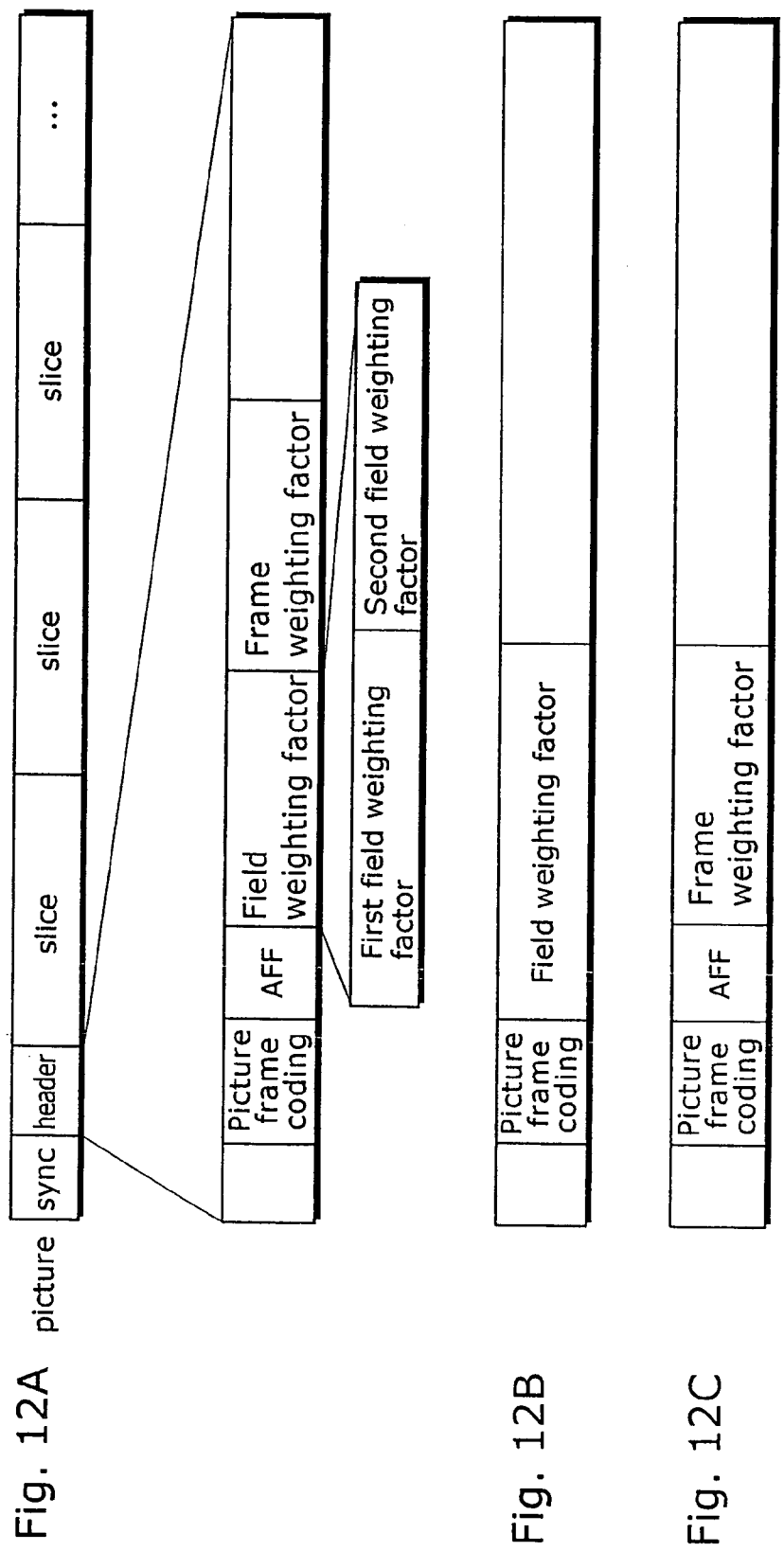
FIG. 12A is a detailed example of a data structure of a "header" included in a common information area in a picture area according to the first embodiment.
FIG. 12B is an example of a case in which only a "field weighting factor" is transmitted as a "picture weighting factor", having no "AFF"s.
FIG. 12C is an example of a case in which field and frame can not be switched on a block-by-block basis since "picture frame coding information" indicates "1" and the "AFF" indicates "0".

FIGS. 12A, 12B and 12C are diagrams showing examples of a data structure of a picture area according to the present embodiment. FIG. 12A is a detailed example of a data structure of a "header" within a common information area in the picture area. In the example of FIG. 12A, the "header" includes "picture frame coding information" which indicates whether the picture is coded on a frame-by-frame basis or on a field-by-field basis. For example, when the "picture frame coding information" indicates "1", the "header" further includes a flag "AFF" indicating whether or not the switching between field and frame on a block-by-block basis takes place. When the "AFF" indicates "1", for instance, this indicates that the switching between field and frame takes place. As shown in FIG. 12A, when the "AFF" indicates "1", both the "field weighting factor" and the "frame weighting factor" are transmitted. The "field weighting factor" includes a "first field weighting factor" and a "second field weighting factor".

When the "picture frame coding information" indicates "0" the picture is coded on a field-by-field basis, therefore, it is impossible to switch between field and frame on a block-by-block basis. Consequently, as shown in FIG. 12B, the "header" does not include the "AFF" and only the "field weighting factor" is transmitted as a "picture weighting factor". In the case of FIG. 12C, where the "picture frame coding information" is "1" and the "AFF" indicates "0", it is impossible to switch between field and frame on a block-by-block basis. Therefore, only the "frame weighting factor" is transmitted as a "picture weighting factor".

Figure 13:
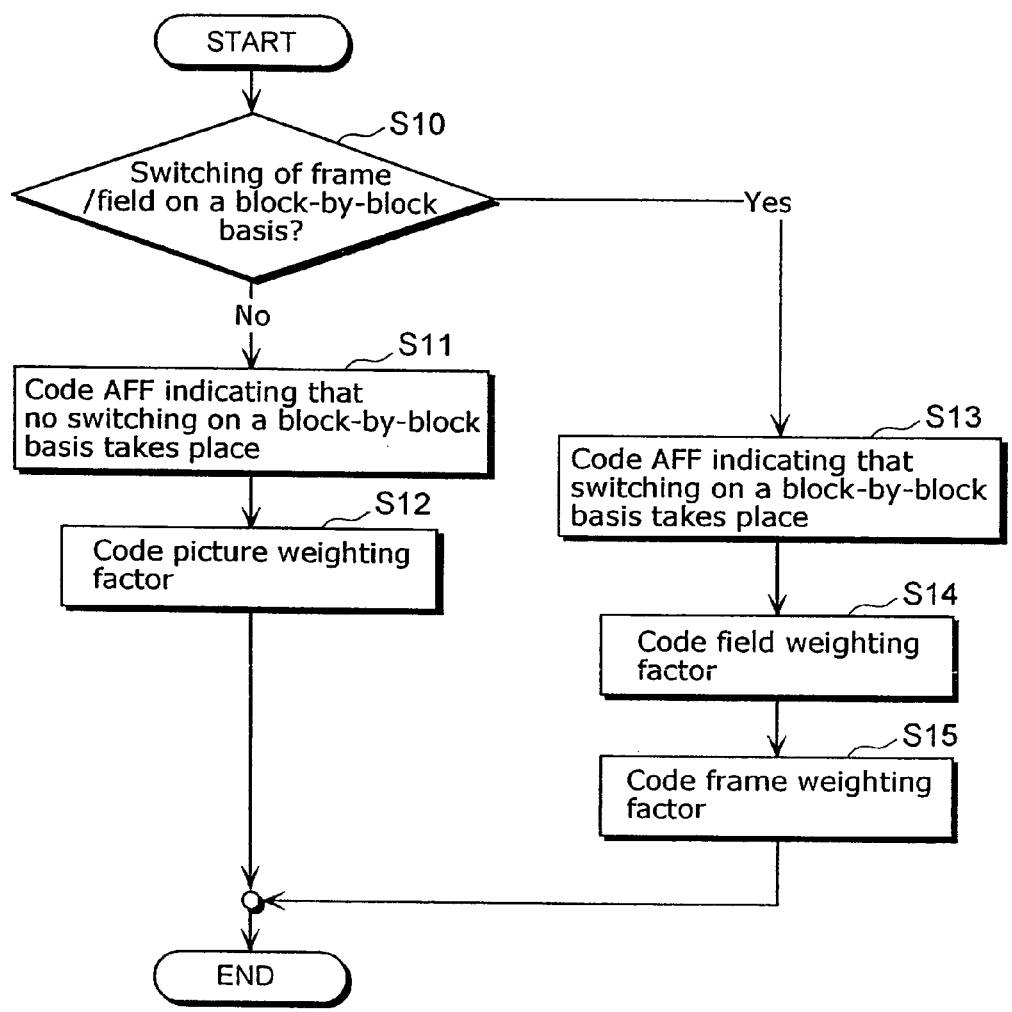
FIG. 13 is a flowchart showing a sequence of coding processing with respect to the weighting factors operated by a variable length decoding unit when "picture frame coding information" indicates "1" and a picture is coded on a frame-by-frame basis, according to the first embodiment.

FIG. 13 is a flowchart showing a sequence of coding processing with respect to the weighting factors operated by the variable length decoding unit VLD when the "picture frame coding information" indicates "1" and the picture is coded on a frame-by-frame basis, according to the present embodiment.

Firstly, when the value of the "AFF" indicates "1" and the frame/field switching is operated on a block-by-block basis (Yes in S10), the "AFF" indicating "switching on a block-by-block basis takes place" is coded (S13), and then, the frame weighting factor and the field weighting factor are coded (S14, S15).

When the value of the "AFF" is "0" and no switching of frame/field takes place on a block-by-block basis (No in S10), the value "0" of the "AFF" indicating "no switching takes place on a block-by-block basis" is coded (S11) and the "picture weighting factor" is coded (S12).

(Variation)

Figure 14:
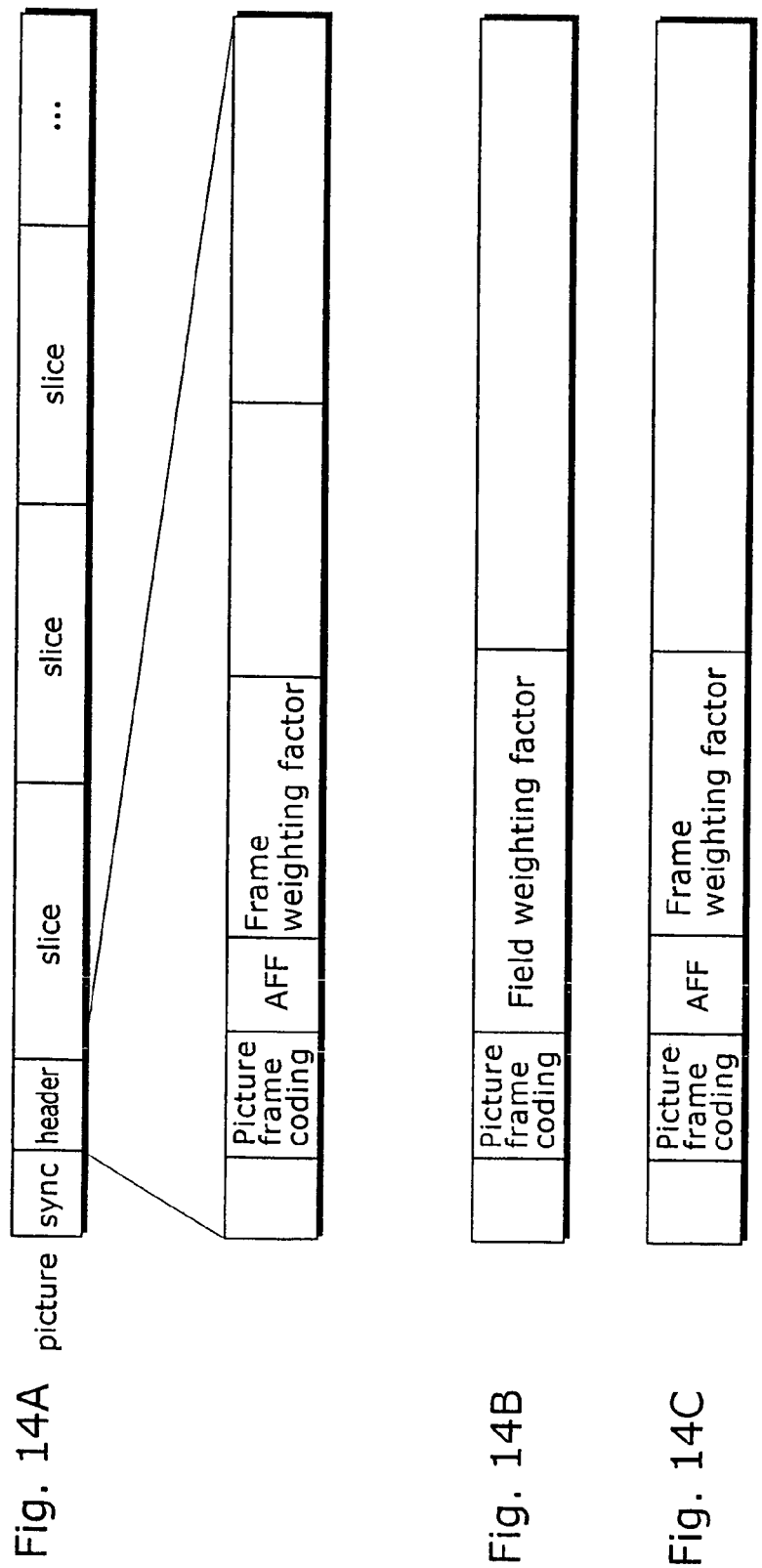
FIG. 14A is a detailed example of a data structure of a "header" included in a common information area in a picture area according to a variation of the first embodiment.
FIG. 14B is an example of a case in which only a "field weighting factor" is transmitted as a "picture weighting factor", having no "AFF"s since the "picture frame coding information" indicates "0" which determines to always field code.
FIG. 14C is an example of a case in which field and frame can not be switched on a block-by-block basis since the "picture frame coding information" indicates "1" and the "AFF" indicates "0".

FIGS. 14A, 14B and 14C are diagrams showing examples of a data structure of a picture area according to a variation of the present embodiment. FIG. 14A is a detailed example of a data structure of a "header" within a common information area in the picture area. In the example of FIG. 14A, the "header" includes "picture frame coding information" which indicates whether the picture is coded on a frame-by-frame basis or on a field-by-field basis. For example, when the "picture frame coding information" indicates "1" (this means that the picture is coded on a frame-by-frame basis), the "header" further includes a flag "AFF" indicating whether or not the switching between field and frame on a block-by-block basis takes place. When the "AFF" indicates "1", for instance, this indicates that the switching between field and frame takes place on a block-by-block basis. As shown in FIG. 14A, when the "AFF" indicates "1" the "frame weighting factor" is transmitted, and the "field weighting factor" appropriates the "frame weighting factor" to the coding processing.

When the "picture frame coding information" indicates "0", it indicates that the picture is coded on a field-by-field basis. In this case, the switching of frame/field on a block-by-block basis does not take place. Therefore, it is impossible to switch between field and frame on a block-by-block basis. Consequently, when the "header" does not include the "AFF" as shown in FIG. 14B, it means that only the "field weighting factor" is transmitted as a "picture weighting factor". In the case of FIG. 14C, where the "picture frame coding information" indicates "1" and the "AFF" indicates "0", the switching of frame/field on a block-by-block basis does not take place and thereby the picture is always coded on a frame-by-frame basis. Therefore, only the "frame weighting factor" is transmitted as a "picture weighting factor".

Figure 15:
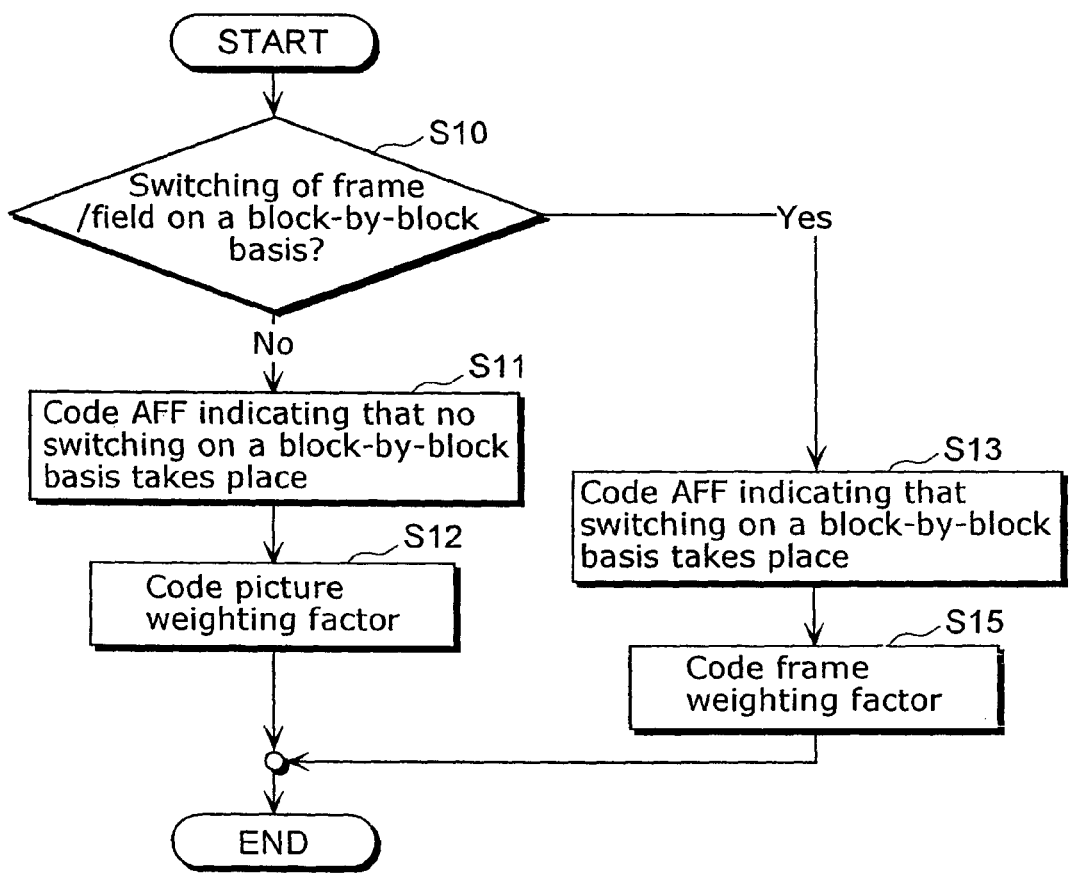
FIG. 15 is a flowchart showing a sequence of coding processing with respect to the weighting factors operated by a variable length decoding unit when the "picture frame coding information" indicates "1" and a picture is coded on a frame-by-frame basis, according to the variation of the first embodiment.

FIG. 15 is a flowchart showing a sequence of coding processing with respect to the weighting factors operated by the variable length coding unit VLC when the "picture frame coding information" indicates "1" and the picture is coded on a frame-by-frame basis, according to the variation of the present embodiment.

Firstly, when the value of the "AFF" is "1" and the switching of frame/field is operated on a block-by-block basis (Yes in S10), the "AFF" indicating "switching on a block-by-block basis takes place" is coded (S13) and the frame weighting factor is coded (S15).

When the value of the "AFF" is "0" and no switching of frame/field takes place on a block-by-block basis (No in S10), the value "0" of the "AFF" indicating "no switching takes place on a block-by-block basis" is coded (S11) and either the "field weighting factor" or the "frame weighting factor" corresponding to a unit of coding a block is coded as a "picture weighting factor" (S12) based on the picture frame coding information.

Figure 16:
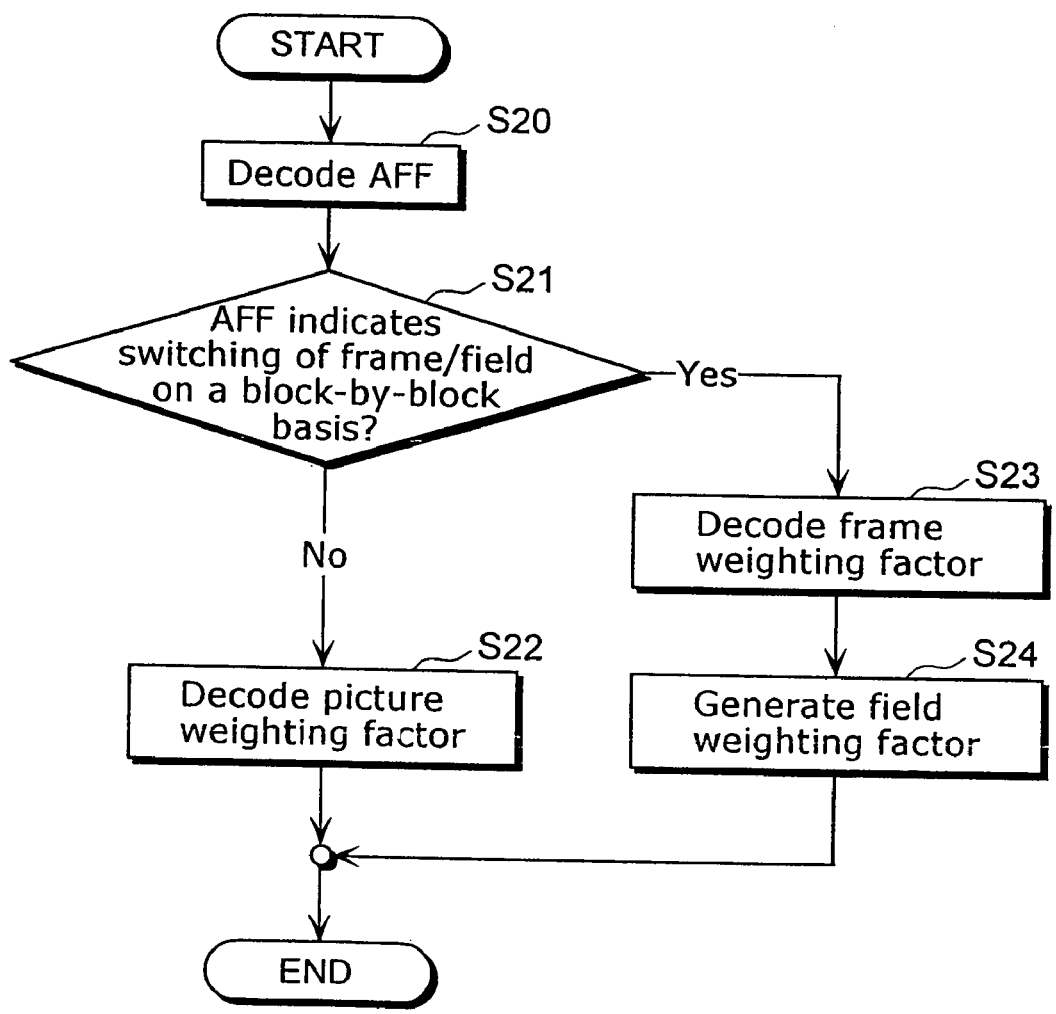
FIG. 16 is a flowchart showing a sequence of decoding processing with respect to the weighting factors when the "picture frame coding information" operated by the variable length coding unit illustrated in FIG. 11 indicates "1" and a picture is coded on a frame-by-frame basis.

FIG. 16 is a flowchart showing a sequence of decoding processing with respect to the weighting factors when the "picture frame coding information" indicates "1" and the picture processed by the variable length decoding unit VLD shown in FIG. 11 is coded on a frame-by-frame basis. This flowchart also corresponds to the sequence of coding processing described in FIG. 13.

Firstly, the variable length decoding unit VLD decodes the "AFF" (S20). When the value of "AFF" is "1" indicating that the switching of frame/field is operated on a block-by-block basis (Yes in S21), the variable length decoding unit VLD decodes the frame weighting factor (S23) and generates a field weighting factor based on it (for instance, appropriating a frame weighting factor) (S24).

On the other hand, when the value of the "AFF" is "0" indicating that the switching of frame/field on a block-by-block basis does not take place (S21: No), the variable length decoding unit VLD decodes either the "field weighting factor" as a "picture weighting factor" or the "field weighting factor" (S22).

Thus, by employing the picture coding/decoding method according to the present embodiment, the switching of frame/field on a block-by-block basis is realized, prediction efficiency is improved, which eventually brings an improvement of the compression rate. Furthermore, even when the "field weighting factor" is not coded, the variable length decoding unit VLD generates the "field weighting factor" based on the "frame weighting factor" so that the switching of field/frame on a block basis takes place without any problems.

SECOND EMBODIMENT

The present embodiment describes an example of a case in which a data structure of a picture area is different from the one illustrated in the first embodiment.

FIGS. 17A, 17B and 17C are diagrams showing examples of a data structure of a picture area according to the present embodiment. These diagrams also show a detailed data structure of a "header" included in a common information area in a picture area. The present embodiment illustrates an example of a structure of the "header" from which a field weighting factor can be abbreviated when the "picture frame coding information" indicates "1" and the picture is coded on a frame-by-frame basis.

As shown in FIGS. 17A and 17B, the "header" includes "Field factor presence/absence information" as well as the "AFF". The "Field factor presence/absence information" is a flag indicating whether or not the "header" has a field weighting factor. For example, the flag is set to "1" when the "header" has the field weighting factor and is set to "0" when the field weighting factor is abbreviated.

FIG. 17A is a case in which both the "AFF" and "Field factor presence/absence information" are set to "1" and the field weighting factor is transmitted. The "field weighting factor" includes the "first field weighting factor" and the "second field weighting factor" as in the case of the first embodiment described above.

FIG. 17B is a case in which the "AFF" is set to "1" and the "Field factor presence/absence information" is set to "0".

FIG. 17C is a case in which the switching of field/frame on a block-by-block basis does not take place since the "AFF" is set to "0".

FIG. 18 is a flowchart showing a sequence of coding processing with respect to the weighting factors operated by the variable length coding unit VLC according to the present embodiment.

Firstly, when the value of the "AFF" indicates "1" and the switching of frame/field on a block-by-block basis is operated (Yes in S10), the variable length coding unit VLC codes the "AFF" indicating that the switching on a block-by-block basis takes place (S31).

Moreover, the variable length coding unit VLC determines whether or not a field weighting factor can be generated based on a frame weighting factor (S32), and when this is possible, codes information indicating the generation of the field weighting factor, and the frame weighting factor (S36, S37). When the field weighting factor is not generated based on the frame weighting factor, the variable length coding unit VLC codes information indicating the presence/absence of the field weighting factor as well as the frame weighting factor and the field weighting factor (S 33~S35).

On the other hand, when the value of the "AFF" is "0" and the switching of frame/field on a block-by-block basis is not operated (No in S10), the subsequent processing is the same as in the flowchart illustrated in FIG. 15 (S11, S12).

FIG. 19 is a flowchart showing a sequence of decoding processing with respect to the weighting factors operated by the variable length decoding unit VLD described in FIG. 11. This flowchart also corresponds to the sequence of the coding processing described in FIG. 18.

Firstly, when the value of the "AFF" is "1" indicating that the switching of frame/field on a block-by-block basis is operated (Yes in S21), the variable length decoding unit VLD decodes the "AFF" (S20) and then decodes the information indicating the presence/absence of the field weighting factor (S41).

Then, the variable length decoding unit VLD determines whether or not the field weighting factor is found (S42), decodes the frame weighting factor when the field weighting factor is not found (S45) and generates the field weighting factor based on the frame weighting factor (S46). When the field weighting factor is found, the variable length decoding unit VLD decodes both the frame weighting factor and the field weighting factor (S43, S44).

On the other hand, when the value of the "AFF" is "0" indicating that the switching of frame/field on a block-by-block basis is not operated (No in S21), the picture weighting factor is decoded (S22).

Thus, by employing the picture coding/decoding method according to the present embodiment, the switching of frame/field on a block-by-block basis is realized. Furthermore, the field weighting factor can be generated based on the frame weighting factor even when the field weighting factor is abbreviated.

THIRD EMBODIMENT

The present embodiment describes a case in which the data structure of the picture area is different from the one illustrated in the first embodiment.

FIGS. 20A, 20B and 20C are diagrams showing examples of the data structure of the picture area according to the present embodiment. It shows a detailed data structure of a "header" when the "picture frame coding information" included in a common information area in a picture area indicates "1" and the picture is coded on a frame-by-frame basis. The present embodiment illustrates an example of the structure of the "header" from which the frame weighting factor can be abbreviated.

As shown in FIGS. 20A and 20B, the "header" includes the "Frame factor presence/absence information" as well as the "AFF". The "Frame factor presence/absence information" is a flag indicating whether or not the "header" includes the frame weighting factor. For example, the flag is set to "1" when the frame weighting factor is found and is set to "0" when the frame weighting factor is abbreviated.

FIG. 20A is a case in which both the "AFF" and the "Frame factor presence/absence information" are set to "1" and the frame weighting factor is transmitted. FIG. 20B is a case in which the "AFF" is set to "1" and the "Frame factor identification information" is set to "0". FIG. 20C is a case in which the switching of field/frame on a block-by-block basis is not operated since the "AFF" is set to "0".

FIG. 21 is a flowchart showing a sequence of coding processing with respect to the weighting factors operated by the variable length coding unit VLC according to the present embodiment.

Firstly, the variable length coding unit VLC codes the "AFF" indicating that the switching on a block-by-block basis is operated (S51) when the value of the "AFF" is "1" and the switching of frame/field on a block-by-block basis takes place (Yes in S10).

Furthermore, the variable length coding unit VLC determines whether or not to generate a frame weighting factor based on a field weighting factor (S52). When a frame weighting factor is generated based on a field weighting factor, the variable length coding unit VLC codes information indicating the generation of the frame weighting factor, and the field weighting factor (S56, S57). When the frame weighting factor is not generated based on the field weighting factor (No in S52), the variable length coding unit VLC codes information indicating the presence/absence of the frame weighting factor as well as the field weighting factor and the frame weighting factor (S53~S55).

On the other hand, when the value of the "AFF" is "0" and the switching of frame/field on a block-by-block basis does not take place (No in S10), the same coding processing as described in FIG. 15 is performed (S11, S12).

Figure 22:
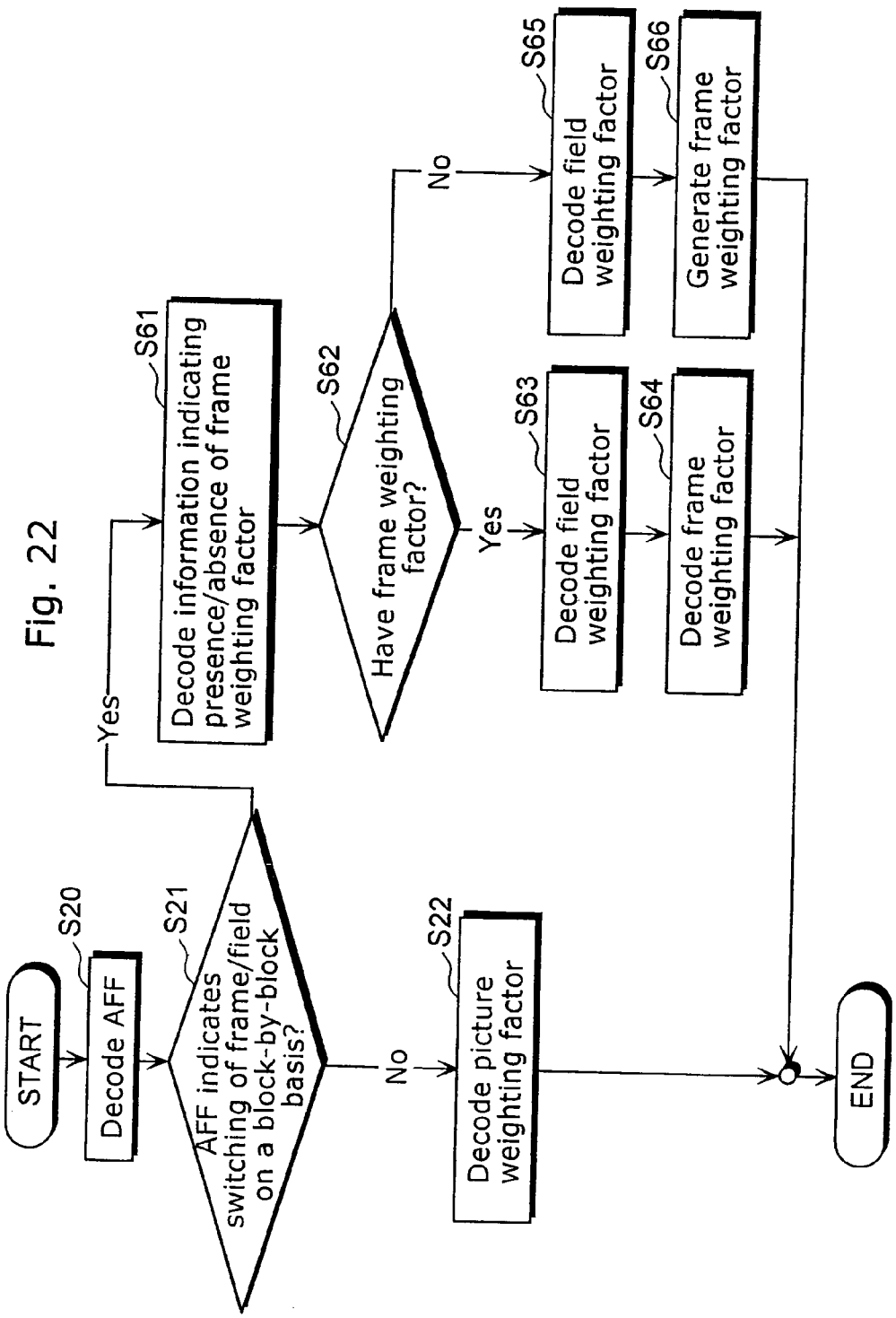
FIG. 22 is a flowchart showing a sequence of decoding processing with respect to the weighting factors operated by a variable length decoding unit according to the third embodiment.

FIG. 22 is a flowchart showing a sequence of decoding processing with respect to the weighting factors operated by the variable length decoding unit VLD illustrated in FIG. 11. This diagram also corresponds to the sequence of the coding processing described in FIG. 21.

Firstly, when the value of the "AFF" is "1" indicating that the switching of frame/field on a block-by-block basis is operated (Yes in S21), the variable length decoding unit VLD firstly decodes the "AFF" (S20) and then the information indicating the presence/absence of the frame weighting factor (S61).

Then, the variable length decoding unit VLD determines whether or not the frame weighting factor is found (S62), decodes the field weighting factor (S65) when the frame weighting factor is not found (Yes in S62) and generates a frame weighting factor based on the field weighting factor (S66). When the frame weighting factor is found (No in S62), both the field weighting factor and the frame weighting factor are decoded (S63, S64).

On the other hand, when the value of the "AFF" is "0" indicating that the switching of frame/field on a block-by-block basis is not operated (No in S21), the variable length decoding unit VLD decodes a picture weighting factor (S22).

Thus, by employing the picture coding/decoding method according to the present embodiment, the switching of field/frame on a block-by-block basis is realized. In addition, the frame weighing factor can be generated based on the field weighting factor even when the frame weighting factor is abbreviated.

FOURTH EMBODIMENT

Furthermore, the processing shown in each of the above embodiments can be carried out easily in an independent computer system by recording the program for realizing the picture coding/decoding method described in each of the above embodiments onto a storage medium such as a flexible disk or the like.

FIG. 23 is an illustration for carrying out the picture coding/decoding method described in each of the above embodiments in the computer system using the program recorded onto the storage medium such as a flexible disk or the like.

Figure 23A:
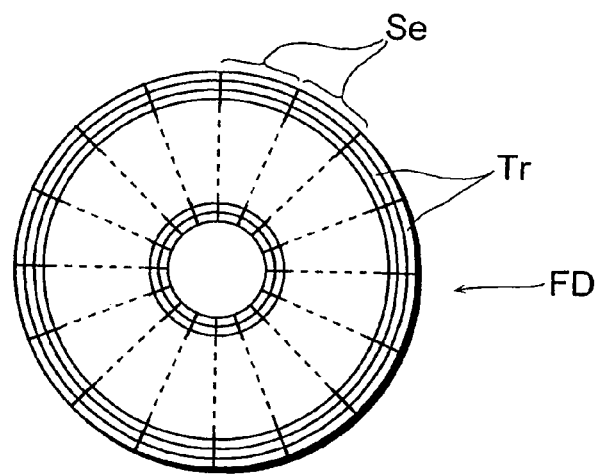
FIGS. 23A~23C are illustrations for performing the picture coding method and the picture decoding method according to the first, second and third embodiments using a program recorded on a recording medium such as a flexible disk.
Figure 23B:
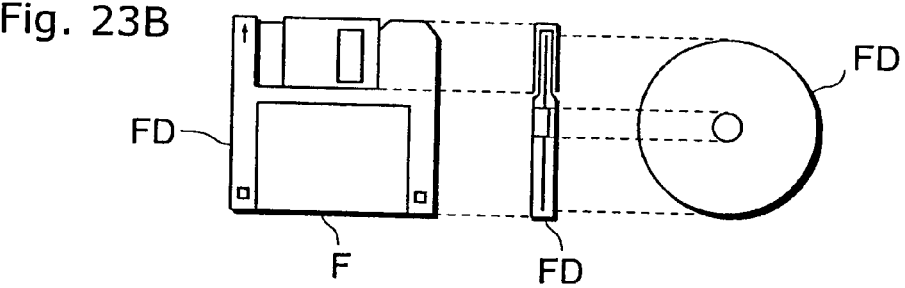

FIG. 23B shows a full appearance of a flexible disk, its structure at cross section and the flexible disk itself whereas FIG. 23A shows an example of a physical format of the flexible disk as a main body of a storage medium. A flexible disk FD is contained in a case F with a plurality of tracks Tr formed concentrically from the periphery to the inside on the surface of the disk, and each track is divided into 16 sectors Se in the angular direction. Thus, the program is stored in an area assigned for it on the flexible disk FD.

Figure 23C:
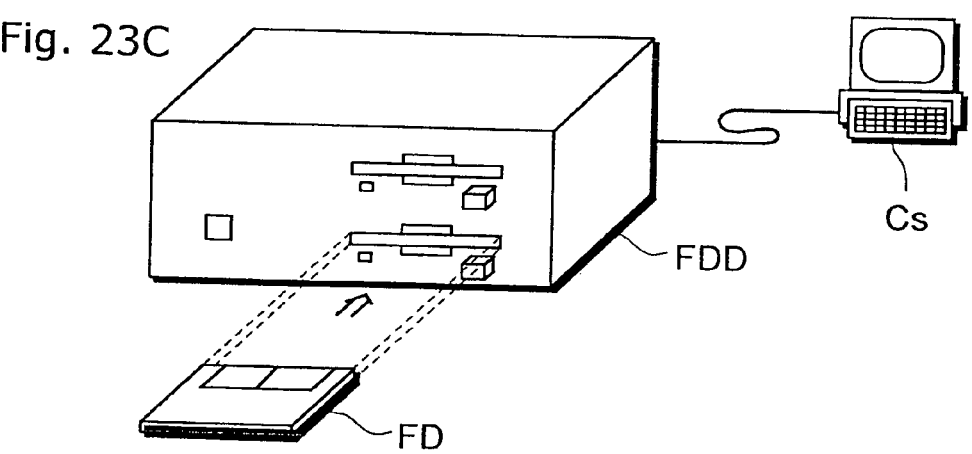

FIG. 23C shows a structure for recording and reading out the program on the flexible disk FD. When the program is recorded on the flexible disk FD, the computer system Cs writes in the program via a flexible disk drive. When the coding apparatus and the decoding apparatus are constructed in the computer system using the program on the flexible disk, the program is read out from the flexible disk and then transferred to the computer system by the flexible disk drive.

The above explanation is made on an assumption that a storage medium is a flexible disk, but the same processing can also be performed using an optical disk. In addition, the storage medium is not limited to a flexible disk and an optical disk, but any other medium such as an IC card and a ROM cassette capable of recording a program can be used.

FIFTH EMBODIMENT

The following is a description for the applications of the picture coding/decoding method illustrated in the above-mentioned embodiments and a system using them.

Figure 24:
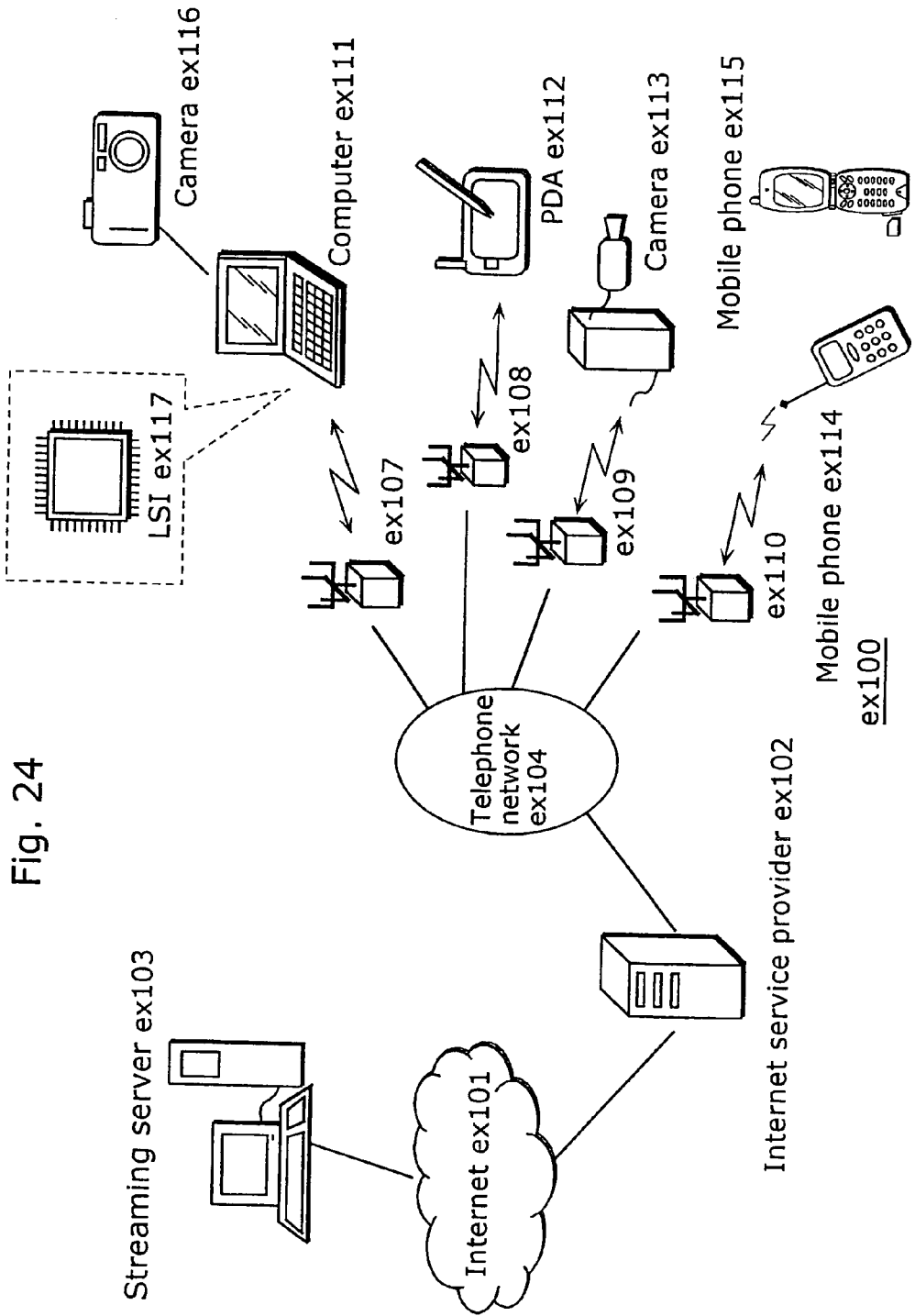
FIG. 24 is a block diagram showing a whole structure of a content supplying system for realizing a content delivery service.

FIG. 24 is a block diagram showing an overall configuration of a content supply system ex100 for realizing content delivery service. The area for providing communication service is divided into cells of desired size, and cell sites ex107~ex110, which are fixed wireless stations, are placed in respective cells.

This content supply system ex100 is connected to apparatuses such as a computer ex111, a PDA (Personal Digital Assistant) ex112, a camera ex113, a mobile phone ex114 and a mobile phone with a camera ex115 via, for example, Internet ex101, an Internet service provider ex102, a telephone network ex104, as well as the cell sites ex107~ex110.

However, the content supply system ex100 is not limited to the configuration shown in FIG. 24 and may be connected to a combination of any of them. Also, each apparatus may be connected directly to the telephone network ex104, not through the cell sites ex107~ex110.

The camera ex113 is an apparatus capable of shooting video such as a digital video camera. The mobile phone ex114 may be a mobile phone of any of the following system: a PDC (Personal Digital Communications) system, a CDMA (Code Division Multiple Access) system, a W-CDMA (Wideband-Code Division Multiple Access) system or a GSM (Global System for Mobile Communications) system, a PHS (Personal Handyphone System) or the like.

A streaming server ex103 is connected to the camera ex113 via the telephone network ex104 and also the cell site ex109, which realizes a live distribution or the like using the camera ex113 based on the coded data transmitted from the user. Either of the camera ex113, the server which transmits the data and the like may code the data. The moving picture data shot by a camera ex116 may be transmitted to the streaming server ex103 via the computer ex111. In this case, either the camera ex116 or the computer ex111 may code the moving picture data. An LSI ex117 included in the computer ex111 and the camera ex116 performs the coding processing. Software for coding and decoding pictures may be integrated into any type of storage medium (such as a CD-ROM, a flexible disk and a hard disk) that is a recording medium which is readable by the computer ex111 or the like. Furthermore, the mobile phone with a camera ex115 may transmit the moving picture data. This moving picture data is the data coded by the LSI included in the mobile phone ex115.

The content supply system ex100 codes contents (such as a music live video) shot by a user using the camera ex113, the camera ex116 or the like in the same way as shown in the above-mentioned embodiments and transmits them to the streaming server ex103, while the streaming server ex103 makes stream delivery of the content data to the clients at their requests. The clients include the computer ex111, the PDA ex112, the camera ex113, the mobile phone ex114 and so on capable of decoding the above-mentioned coded data. In the content supply system ex100, the clients can thus receive and reproduce the coded data, and can further receive, decode and reproduce the data in real time so as to realize personal broadcasting.

When each apparatus in this system performs coding or decoding, the picture coding apparatus or the picture decoding apparatus shown in the above-mentioned embodiments can be used.

A cell phone will be explained as an example of such apparatus.

Figure 25:
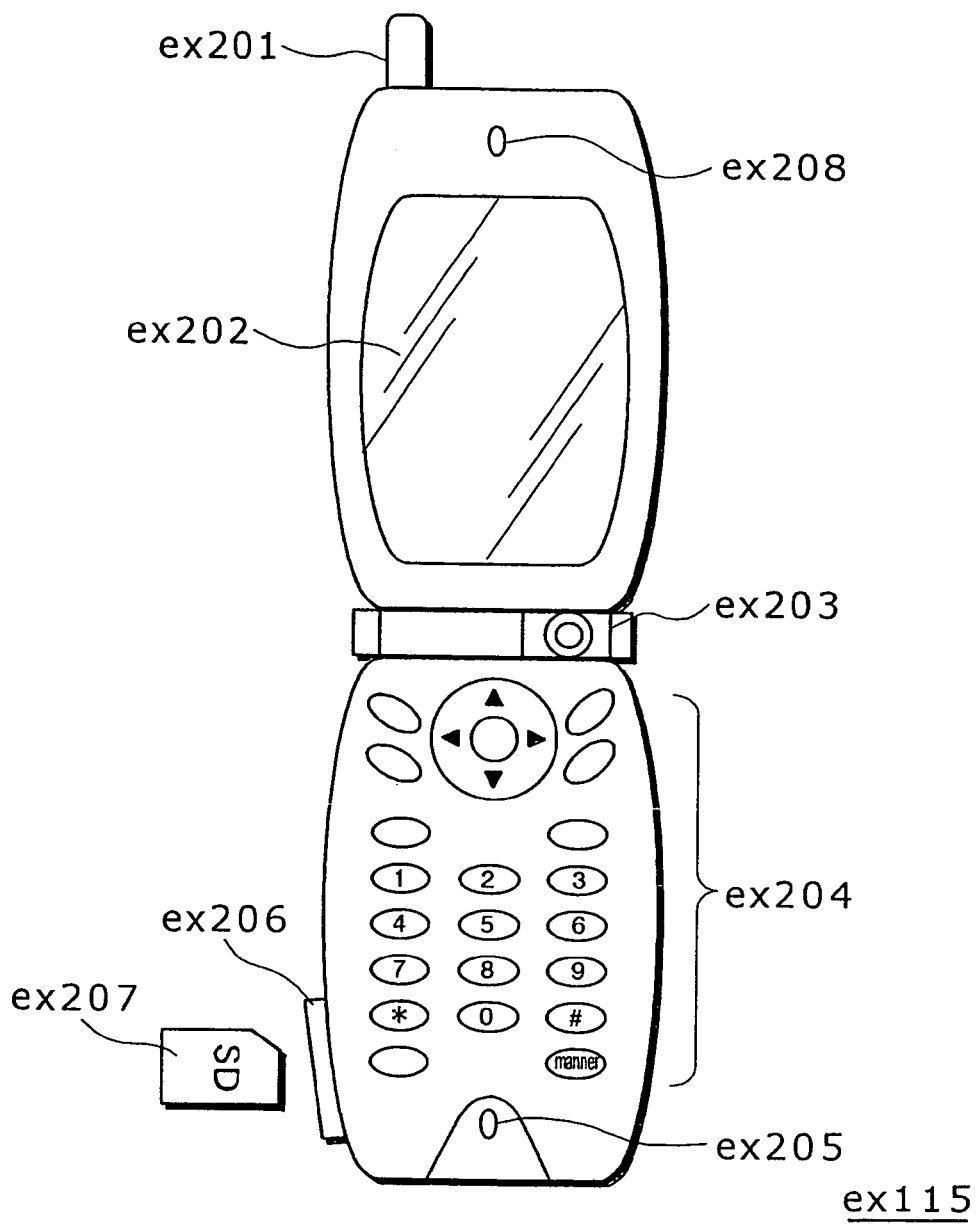
FIG. 25 is a diagram showing an example of a cell phone.

FIG. 25 is a diagram showing the mobile phone ex115 using the picture coding/decoding method explained in the above-mentioned embodiments. The mobile phone ex115 has an antenna ex201 for communicating with the cell site ex110 via radio waves, a camera unit ex203 such as a CCD camera capable of shooting moving and still pictures, a display unit ex202 such as a liquid crystal display for displaying the data such as decoded pictures and the like shot by the camera unit ex203 or received by the antenna ex201, a body unit including a set of operation keys ex204, an audio output unit ex208 such as a speaker for outputting audio, an audio input unit ex205 such as a microphone for inputting audio, a storage medium ex207 for storing coded or decoded data such as data of moving or still pictures shot by the camera, data of received e-mails and that of moving or still pictures, and a slot unit ex206 for attaching the storage medium ex207 to the mobile phone ex115. The storage medium ex207 stores in itself a flash memory element, a kind of EEPROM (Electrically Erasable and Programmable Read Only Memory) that is a non-volatile memory electrically erasable from and rewritable to a plastic case such as an SD card.

Next, the mobile phone ex115 will be explained with reference to FIG. 26. In the mobile phone ex115, a main control unit ex311, designed in order to control overall each unit of the main body which contains the display unit ex202 as well as the operation keys ex204, is connected mutually to a power supply circuit unit ex310, an operation input control unit ex304, a picture coding unit ex312, a camera interface unit ex303, an LCD (Liquid Crystal Display) control unit ex302, a picture decoding unit ex309, a multiplexing/demultiplexing unit ex308, a read/write unit ex307, a modem circuit unit ex306 and an audio processing unit ex305 via a synchronous bus ex313.

When a call-end key or a power key is turned ON by a user's operation, the power supply circuit unit ex310 supplies respective units with power from a battery pack so as to activate the digital mobile phone with a camera ex115 as a ready state.

In the mobile phone ex115, the audio processing unit ex305 converts the audio signals received by the audio input unit ex205 in conversation mode into digital audio data under the control of the main control unit ex311 including a CPU, ROM and RAM, the modem circuit unit ex306 performs spread spectrum processing for the digital audio data, and the communication circuit unit ex301 performs digital-to-analog conversion and frequency conversion for the data, so as to transmit it via the antenna ex201. Also, in the mobile phone ex115, the communication circuit unit ex301 amplifies the data received by the antenna ex201 in conversation mode and performs frequency conversion and the analog-to-digital conversion to the data, the modem circuit unit ex306 performs inverse spread spectrum processing of the data, and the audio processing unit ex305 converts it into analog audio data, so as to output it via the audio output unit ex208.

Furthermore, when transmitting an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs the digital-to-analog conversion and the frequency conversion for the text data, the data is transmitted to the cell site ex110 via the antenna ex201.

When picture data is transmitted in data communication mode, the picture data shot by the camera unit ex203 is supplied to the picture coding unit ex312 via the camera interface unit ex303. When it is not transmitted, it is also possible to display the picture data shot by the camera unit ex203 directly on the display unit ex202 via the camera interface unit ex303 and the LCD control unit ex302.

The picture coding unit ex312, which includes the picture coding apparatus as explained in the present invention, compresses and codes the picture data supplied from the camera unit ex203 using the coding method employed by the picture coding apparatus as shown in the first embodiment so as to transform it into coded image data, and sends it out to the multiplexing/demultiplexing unit ex308. At this time, the mobile phone ex115 sends out the audio received by the audio input unit ex205 during the shooting with the camera unit ex203 to the multiplexing/demultiplexing unit ex308 as digital audio data via the audio processing unit ex305.

The multiplexing/demultiplexing unit ex308 multiplexes the coded image data supplied from the picture coding unit ex312 and the audio data supplied from the audio processing unit ex305, using a predetermined method, then the modem circuit unit ex306 performs spread spectrum processing of the multiplexed data obtained as a result of the multiplexing, and lastly the communication circuit unit ex301 performs digital-to-analog conversion and frequency transform of the data for the transmission via the antenna ex201.

As for receiving data of a moving picture file which is linked to a Web page or the like in data communication mode, the modem circuit unit ex306 performs inverse spread spectrum processing for the data received from the cell site ex110 via the antenna ex201, and sends out the multiplexed data obtained as a result of the inverse spread spectrum processing.

In order to decode the multiplexed data received via the antenna ex201, the multiplexing/demultiplexing unit ex308 demultiplexes the multiplexed data into a coded stream of image data and that of audio data, and supplies the coded image data to the picture decoding unit ex309 and the audio data to the audio processing unit ex305, respectively via the synchronous bus ex313.

Next, the picture decoding unit ex309, including the picture decoding apparatus as explained in the above-mentioned invention, decodes the coded stream of the image data using the decoding method corresponding to the coding method as shown in the above-mentioned embodiments to generate reproduced moving picture data, and supplies this data to the display unit ex202 via the LCD control unit ex302, and thus the image data included in the moving picture file linked to a Web page, for instance, is displayed. At the same time, the audio processing unit ex305 converts the audio data into analog audio data, and supplies this data to the audio output unit ex208, and thus the audio data included in the moving picture file linked to a Web page, for instance, is reproduced.

Figure 27:
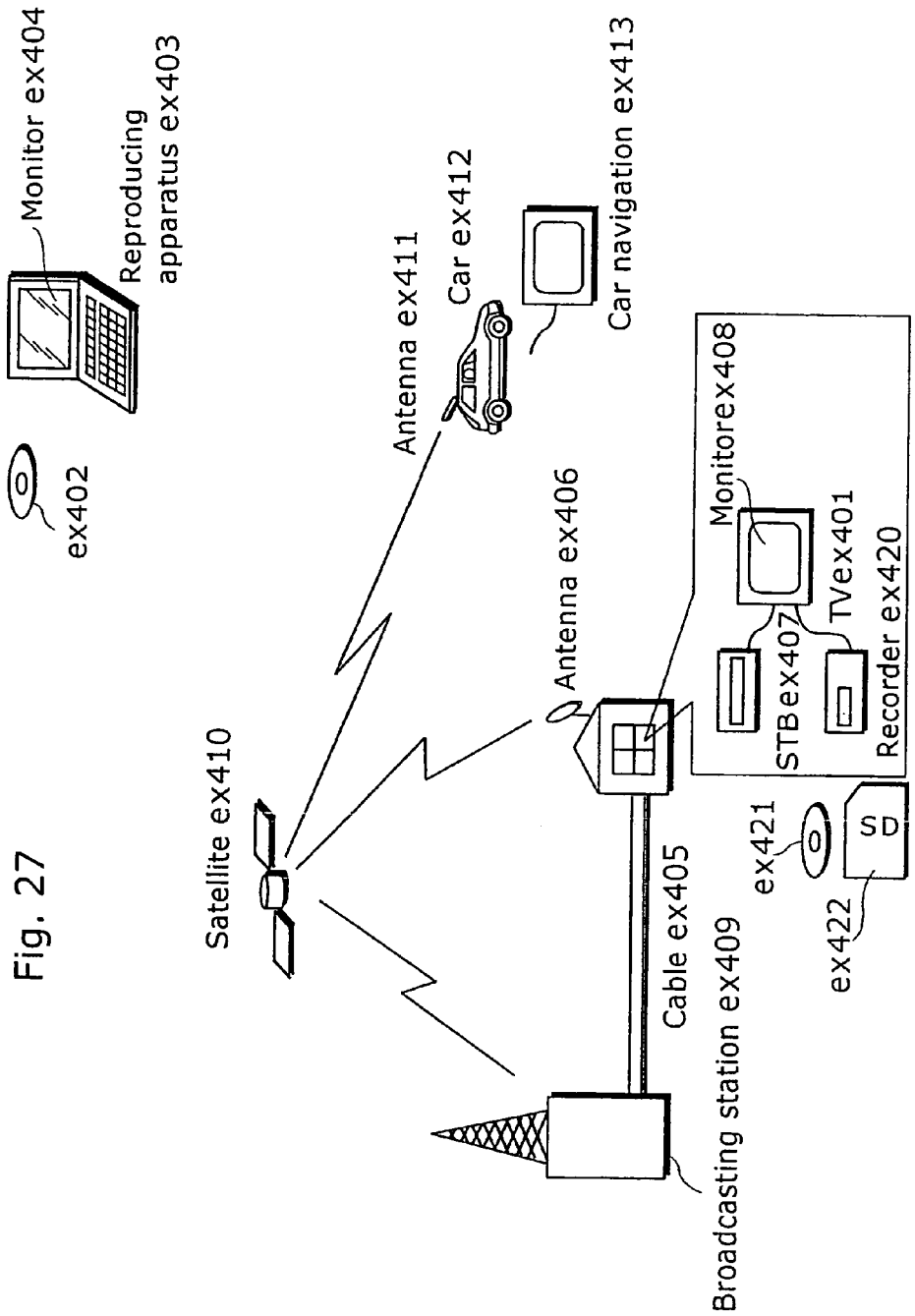
FIG. 27 is a block diagram showing a whole structure of a digital broadcasting system.

The present invention is not limited to the above-mentioned system since ground-based or satellite digital broadcasting has been in the news lately and at least either the picture coding apparatus or the picture decoding apparatus described in the above-mentioned embodiments can be incorporated into a digital broadcasting system as shown in FIG. 27. More specifically, a coded stream of video information is transmitted from a broadcast station ex409 to or communicated with a broadcast satellite ex410 via radio waves. Upon receipt of it, the broadcast satellite ex410 transmits radio waves for broadcasting. Then, a home-use antenna ex406 with a satellite broadcast reception function receives the radio waves, and a television (receiver) ex401 or a set top box (STB) ex407 decodes a coded bit stream for reproduction. The picture decoding apparatus as shown in the above-mentioned embodiments can be implemented in the reproducing apparatus ex403 for reading out and decoding the coded stream recorded on a storage medium ex402 that is a recording medium such as a CD and a DVD. In this case, the reproduced moving picture signals are displayed on a monitor ex404. It is also conceivable to implement the picture decoding apparatus in the set top box ex407 connected to a cable ex405 for a cable television or the antenna ex406 for satellite and/or ground-based broadcasting so as to reproduce them on a monitor ex408 of the television ex401. The picture decoding apparatus may be incorporated into the television, not in the set top box. Also, a car ex412 having an antenna ex411 can receive signals from the satellite ex410 or the cell site ex107 for replaying moving pictures on a display device such as a car navigation system ex413 set in the car ex412.

Furthermore, the picture coding apparatus as shown in the above-mentioned embodiments can code picture signals and record them on a storage medium. As a concrete example, a recorder ex420 such as a DVD recorder for recording picture signals on a DVD disk ex421, a disk recorder for recording them on a hard disk can be cited. They can be recorded on an SD card ex422. When the recorder ex420 includes the picture decoding apparatus as shown in the above-mentioned embodiments, the picture signals recorded on the DVD disk ex421 or the SD card ex422 can be reproduced for display on the monitor ex408.

Figure 26:
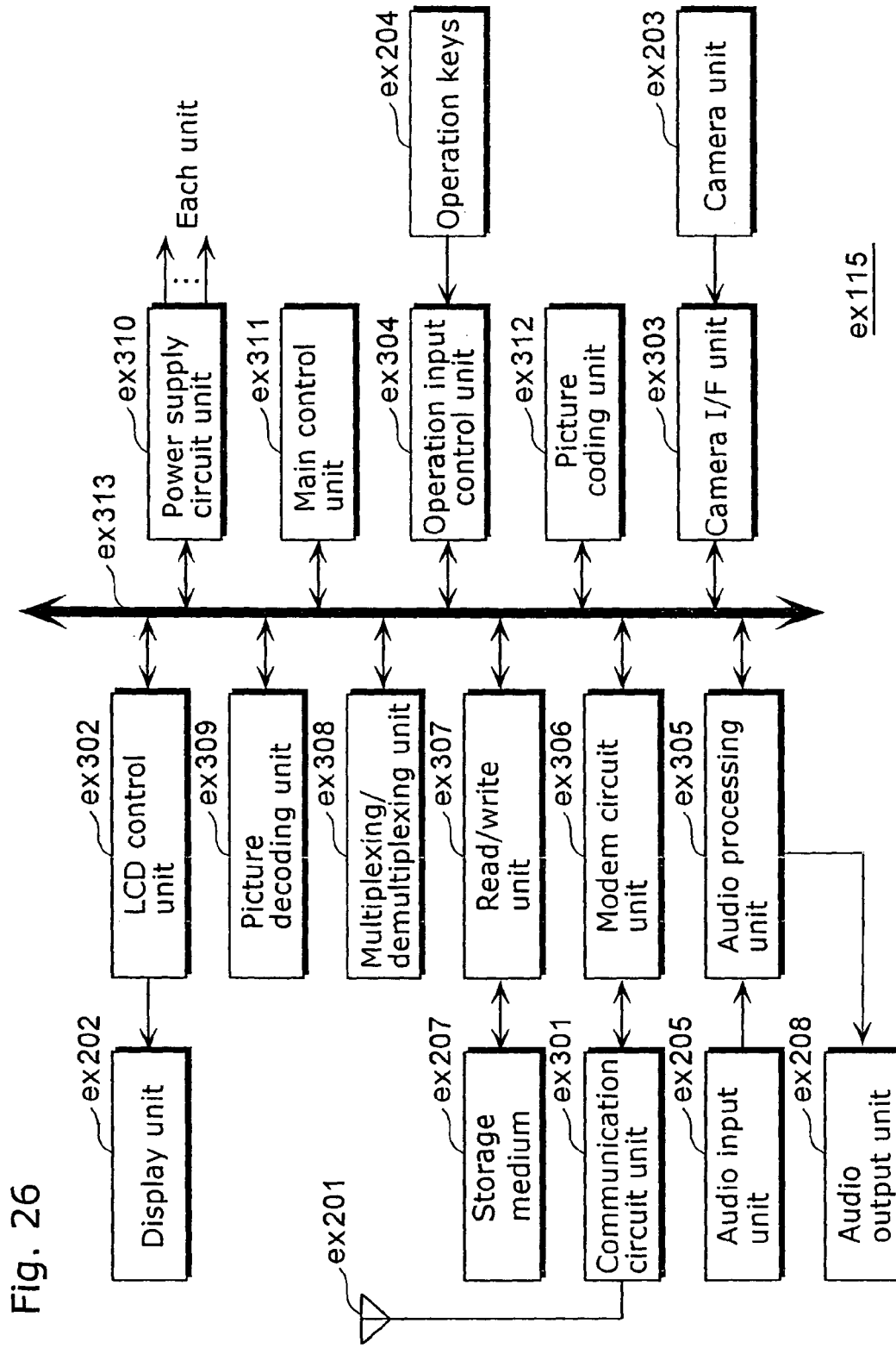
FIG. 26 is a block diagram showing an internal structure of the cell phone.

As for the structure of the car navigation system ex413, the structure without the camera unit ex203, the camera interface unit ex303 and the picture coding unit ex312, out of the components shown in FIG. 26, is conceivable. The same applies for the computer ex111, the television (receiver) ex401 and others.

In addition, three types of implementations can be conceived for a terminal such as the mobile phone ex114; a sending/receiving terminal implemented with both an encoder and a decoder, a sending terminal implemented with an encoder only, and a receiving terminal implemented with a decoder only.

As described above, it is possible to use the picture coding method and the picture decoding method described in the above-mentioned embodiments for any of the above-mentioned apparatuses and systems, and by using these methods, the effects described in the above-mentioned embodiments can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

Thus, with the picture coding/decoding method according to the present invention, it is possible to realize the switching of field/frame on a block basis and improve the prediction efficiency and the compression rate.

Moreover, with the picture coding/decoding method according to the present invention, the field weighting factor is generated based on the field weighting factor, therefore, the field weighting factor can be abbreviated from the data to be transmitted and thereby the transmission efficiency can be improved. Consequently, its practical value is high.

The present invention can be applied to the picture coding apparatus, the picture decoding apparatus and the methods thereof for performing motion estimation by switching frame/field on a block-by-block basis, and is useful especially for the picture coding apparatus as described above for performing motion estimation using the weighting factors.

The invention claimed is:

1. A picture coding apparatus which codes a picture on a block-by-block basis, the picture coding apparatus comprising:
    a motion compensation unit configured to generate, when performing frame coding on a block included in the picture, a predictive image using i) pixel values of a reference frame to which the block refers and ii) a frame weighting factor, and to generate, when performing field coding on the block, a predictive image using i) pixel values of a reference field to which the block refers and ii) a field weighting factor; and
    a variable length coding unit configured to code the frame weighting factor and output a coded signal which includes i) a coded picture generated using the predictive image and ii) the coded frame weighting factor, when the picture has a frame structure and switching between the frame coding and the field coding is adaptively performed per block included in the picture,
    wherein the field weighting factor is generated from the frame weighting factor when the picture has the frame structure and the switching between the frame coding and the field coding is adaptively performed per block included in the picture, and
    the field weighting factor and the frame weighting factor are coefficients used for calculating pixel values of the predictive image from pixel values of a reference picture.

2. A picture coding method for coding a picture on a block-by-block basis, the picture coding method comprising:
    generating, when of performing frame coding on a block included in the picture, a predictive image using i) pixel values of a reference frame to which the block refers and ii) a frame weighting factor, and to generate, when of performing field coding on the block, a predictive image using i) pixel values of a reference field to which the block refers and ii) a field weighting factor; and
    coding the frame weighting factor and output a coded signal which includes i) a coded picture generated using the predictive image and ii) the coded frame weighting factor, when the picture has a frame structure and switching between the frame coding and the field coding is adaptively performed per block included in the picture,
    wherein the field weighting factor is generated from the frame weighting factor when the picture has the frame structure and the switching between the frame coding and the field coding is adaptively performed per block included in the picture, and
    the field weighting factor and the frame weighting factor are coefficients used for calculating pixel values of the predictive image from pixel values of a reference picture.

* * * * *